United States Patent
He et al.

(10) Patent No.: US 7,131,587 B2
(45) Date of Patent: Nov. 7, 2006

(54) SYSTEM AND METHOD FOR ILLUMINATING AND READING OPTICAL CODES IMPRINTED OR DISPLAYED ON REFLECTIVE SURFACES

(75) Inventors: Duanfeng He, Setuaket, NY (US); Eugene B. Joseph, Coram, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 8 days.

(21) Appl. No.: 10/858,247

(22) Filed: Jun. 1, 2004

(65) Prior Publication Data

US 2005/0194449 A1 Sep. 8, 2005

Related U.S. Application Data

(63) Continuation of application No. 10/791,018, filed on Mar. 2, 2004.

(51) Int. Cl.
*G06K 7/10* (2006.01)
(52) U.S. Cl. .................. 235/454; 235/462.24
(58) Field of Classification Search ............... 235/454
See application file for complete search history.

(56) References Cited

U.S. PATENT DOCUMENTS

| | | | | |
|---|---|---|---|---|
| 6,462,941 B1* | 10/2002 | Hulick et al. | | 361/683 |
| 6,711,005 B1* | 3/2004 | Martin | | 361/683 |
| 6,819,386 B1* | 11/2004 | Roosendaal et al. | | 349/144 |
| 6,927,747 B1* | 8/2005 | Amirzadeh et al. | | 345/4 |
| 2002/0149924 A1* | 10/2002 | Falicoff et al. | | 362/19 |
| 2003/0058383 A1* | 3/2003 | Jagt et al. | | 349/65 |
| 2003/0063243 A1* | 4/2003 | Roosendaal et al. | | 349/113 |
| 2003/0090442 A1* | 5/2003 | Hattori et al. | | 345/60 |
| 2004/0008884 A1* | 1/2004 | Simske et al. | | 382/165 |
| 2004/0017361 A1* | 1/2004 | Lieu | | 345/169 |
| 2004/0066645 A1* | 4/2004 | Graf et al. | | 362/31 |
| 2005/0011957 A1* | 1/2005 | Attia et al. | | 235/462.46 |
| 2005/0074146 A1* | 4/2005 | Jones et al. | | 382/110 |

\* cited by examiner

*Primary Examiner*—Steven S. Paik
(74) *Attorney, Agent, or Firm*—Carter DeLuca Farrell & Schmidt LLP

(57) ABSTRACT

An optical code reading system and method are provided for reading optical codes imprinted or displayed on, or behind, reflective surfaces. The system includes an extended light source, including one of a backlight assembly and a frontlight assembly, emitting an extended-beam light for directly illuminating an optical code, at least one image sensor for sensing light reflected by the optical code and generating signals related to at least one image of the optical code, and at least one processor for processing at least a portion of the signals, generating a decodable image corresponding to the signals, and decoding at least a portion of the decodable image.

34 Claims, 13 Drawing Sheets

SYSTEM AND METHOD FOR ILLUMINATING AND READING OPTICAL CODES IMPRINTED OR DISPLAYED ON REFLECTIVE SURFACES

CROSS REFERENCE TO RELATED APPLICATIONS

This application is a continuation of U.S. application Ser. No. 10/791,018, filed on Mar. 2, 2004 by He et al., the contents of which are incorporated herein by reference in their entirety.

BACKGROUND OF THE INVENTION

1. Field of the Invention

This invention relates to illuminating and reading optical codes using optical code reading devices. In particular, this invention relates to a system and method for illuminating and reading optical codes imprinted or displayed on reflective surfaces.

2. Description of the Prior Art

As industry has continued to refine and improve production techniques and procedures, corresponding requirements have been levied for placing identifying data related markings upon components of manufactured assemblies. These markings enable tracking of, for example, the historical stages of a product's manufacture. Further, these markings enable components of complex machinery, such as automobiles and the like, to be identified, for example, in the course of an investigation by quality control personnel or governmental authorities.

A variety of product marking approaches has been utilized in industry. For example, paper tags or labels carrying UPC codes are typically applied to components in the course of a product's assembly. This method provides identifying codes that are highly readable by prior art optical code readers. However, for many applications, such tags or labels may be lost, damaged or altered—rendering the coding useless. This shortcoming is well addressed by Direct Part Marking (DPM) and consequently DPM has gained widespread acceptance in industrial applications by providing durable markings, or code symbols, capable of being placed directly on a wide range of surfaces.

DPM is the technique of directly imprinting, etching or dot-peening (indentation marking) product and component surfaces with any of a number of symbologies—particularly high-density 2-D code symbologies, such as Data Matrix and QR Code, but even commonly used UPC codes are produced in this manner. However, as a result of being formed directly onto a wide variety of materials and textures, proper reading (and subsequently decoding) of DPM codes poses a challenge. Readability of DPM codes is typically a function of contrast between the code symbol and the background surface. The DPM method does not typically provide for the selection of background color or foreground color or reflectivity of the symbol markings, especially in the case of etching and dot-peening. Therefore, DPM markings often have low and inconsistent contrast, typically resulting in limited code readability.

Additionally, applications exist for displaying optical codes on screens, such as CRT or LCD displays, such as a cell phone display. For example, a consumer transaction may be performed using a cell phone where a consumer uses the cell phone to purchase a ticket, such as an event ticket or a lottery ticket, including making payment via the cell phone and receiving the purchased ticket as an electronic ticket through the cell phone in the form of a message bearing a barcode which is displayable by the cell phone. Upon redemption of the ticket, the electronic ticket's barcode displayed on the cell phone is scanned by the merchant redeeming the ticket.

Generally, prior art optical code scanners are designed for scanning paper-based optical codes. Optical codes, such as UPC symbols, printed on labels provide high contrast through selection of background and foreground colors—usually black geometrical shapes or foreground on a white background. Furthermore, paper's superb omni-directional scattering property covers up much of the traces of the structure in the light source.

However, many objects marked with a DPM code and display screens (e.g., mobile phone, CRT, LCD, plasma, etc., displays) displaying barcodes may have surfaces of entirely different characteristics. In some cases, a smooth surface may form a reflected image of the light source and cause the optical code symbol to appear washed-out or even indiscernible from its surroundings; in such circumstances, an extended light source, providing a large and uniform emission surface, would be desirable. Further, the precise angle of the originating light source, with respect to the DPM markings, needs to be controlled in order for variations in surface texture created by the marking method to reflect the light with different intensities. Surface background conditions that are reflective, or yield very little visible symbol contrast to the naked eye under general room lighting, can become highly visible when illuminated by a light source at a given angle from the surface. In such circumstances, directional (or direct-point) illumination is desirable.

One commercially available prior art DPM scanner (see Prior Art FIG. 1a) provides an extended light source and covers multiple angles. This prior art scanner is equipped with a lens 100 positioned in an optical path between an optical code (not shown) and an image sensor 105. The optical code is illuminated by a set of LEDs 101 situated behind a diffusing plate 102. The diffusing plate 102 transmits the light produced by the LEDs 101 as diffuse illumination instead of direct illumination. Additionally, a diffusing tube 103 prevents ambient light from illuminating the optical code, thus the only illumination applied to the optical code originates from the diffusing plate 102. Baffles 104, configured to prevent stray light from escaping the diffusing plate 102 directly into an aperture 120, are positioned around the aperture 120 leading to the lens 100.

However, this system has two limitations of particular interest with respect to the present invention. First, this system is relatively large, making the scanner cumbersome and generally unsuitable for integration with handheld computing devices. Second, the translucent diffusing plate used by this system has to be relatively thick to be effective for providing a large and uniform emission surface. The overly thick diffusing plate, however, is inefficient for transmitting light, and consequently requires more powerful illumination than would be necessary with by a light source.

In other instances, DPM images obtained using direct point light sources, or alternatively narrow beam light sources, produce better contrast, especially for DPM marks made using dot-peening methods—the method of repeatedly impacting the part surface with a sharp tool, thus, forming indentations on the surface. The indentations tend to reflect light at angles substantially similar to the incident angles of the illumination source. Another commercially available DPM scanner (shown in Prior Art FIG. 1b) combines the extended light source method described above and illustrated in FIG. 1a with a direct point light source method. The scanner depicted in FIG. 1b is equipped with a first and second set of LEDs 107. The first set of LEDs 107 is positioned close to the lens 106 for providing direct illumination of the optical code. The second set of LEDs 107 lying on the cover/diffusing plate 108 provide diffuse illumination to the optical code. This system allows multiple illumination sources to be utilized to provide the image sensor 109 with a decodable image of the optical code. However, this scanner is even larger than the extended light source DPM scanner described previously and illustrated in FIG. 1a.

Other commercially available systems include several banks of LEDs that are switched on at different times to illuminate the DPM markings from various directions using the same color. The image having the highest contrast is then selected for decoding. The contrast in the images obtained varies with each illumination direction; successful decoding depends on properly illuminating the DPM code or marking from at least one of the illumination directions.

Another system is available in which an extended light source is provided at a substantial angle to a reflective diffuser which reflects the light emitted by the extended light source for redirecting the light to an optical code being imaged. The angle of the extended light source and the reflective diffuser relative to one another and to a front face of the device creates the need for the device to have a substantial depth and to be relatively cumbersome.

SUMMARY OF THE INVENTION

It is an aspect of the present invention to provide a system and method for illuminating and reading optical codes imprinted or displayed on reflective surfaces.

An embodiment of the system, in accordance with the present invention, includes an extended light source. The extended light source includes one of a backlight and frontlight assembly, configured for emitting an extended-beam light for directly illuminating an optical code. The system also includes at least one image sensor for sensing light reflected by the optical code and generating signals related to at least one image of the optical code. The system further includes at least one processor for processing at least a portion of the signals, generating a decodable image corresponding to the signals, and decoding at least a portion of the decodable image.

An alternate embodiment of the system is a handheld processing device having an illuminated display and a camera disposed within the housing. The illuminated display is configured for displaying data and providing an extended-beam, light for illuminating an optical code. The camera is configured and positioned for sensing the optical code illuminated by the illuminated display and generating corresponding signals. Furthermore, the handheld processing device includes at least one processor configured for processing the signals.

Another aspect of the present invention is to provide a system and method incorporated into a computing device, such as a handheld computer or mobile phone, having a camera or image sensor for illuminating and reading optical codes imprinted or displayed on reflective surfaces. In such an embodiment of the present invention, the computing device or mobile phone includes a display screen, equipped with a backlight or frontlight, for providing an extended light source during imaging of an optical code by the built-in camera or image sensor. Additionally, an LED may be mounted on or near the built-in camera or image sensor for providing a direct point light source for emitting a narrow light beam, such as a unidirectional light toward the optical code.

Another aspect of the present invention provides a method for reading an optical code including the steps of: emitting with at least one of a backlight and frontlight assembly an extended-beam light towards the optical code for directly illuminating the optical code, sensing light reflected from the optical code, generating at least one image of the optical code corresponding to the sensed light, and decoding at least a portion of the at least one image.

Yet another aspect of the present invention is to provide software installable on a handheld computer device or mobile phone. The software is directed toward controlling the illumination of a display screen for illuminating the optical code and displaying or clearing data on the display screen in accordance with the present invention. The software may be stored on a computer readable medium and or transmitted as a propagated signal embodied in a transmission signal.

In another aspect of the present invention a frontlight assembly is provided including a plurality of LEDs, wherein at least a portion of the plurality of LEDs are packaged together in an LED light bar, and a lightpipe receiving light emitted by the plurality of LEDs and emitting an extended-beam light.

In yet another aspect of the present invention a frontlight assembly is provided including a plurality of LEDs, wherein at least a portion of the plurality of LEDs are packaged together in an LED light bar; and a lightpipe receiving light emitted by the light bar and emitting an extended-beam light.

In yet another aspect of the present invention, a frontlight assembly is provided including a plurality of LEDs; and a lightpipe receiving light emitted by the plurality of LEDs and emitting an extended-beam light. The lightpipe includes at least one column portion having a flat surface receiving light from a first direction and passing the light so that it travels in the first direction towards an outlet; and at least one slanted portion having a slanted surface receiving light from a second direction and redirecting the light to travel in the first direction towards the outlet; wherein the plurality of LEDs includes a first group of LEDs for generating light directed at the lightpipe from the first direction and a second group of LEDs for generating light directed at the lightpipe from the second direction.

In a further aspect of the invention, a light source is provided for a light assembly having a first lightpipe. The light source includes a plurality of LEDs, and a second lightpipe receiving light emitted by the plurality of LEDs and emitting an extended-beam light. The second lightpipe includes at least one column portion having a flat surface receiving light from a first direction and passing the light so that it travels in the first direction towards the first lightpipe; and at least one slanted portion having a slanted surface receiving light from a second direction and redirecting the light to travel in the first direction towards the first lightpipe. The plurality of LEDs includes a first group of LEDs for generating light directed at the second lightpipe from the first direction and a second group of LEDs for generating light directed at the second lightpipe from the second direction.

BRIEF DESCRIPTION OF THE DRAWINGS

These and other features, aspects, and advantages of the present invention will become better understood with reference to the below listed drawings, and detailed description of the invention:

FIG. 9b is a schematic diagram an embodiment of the optical code reading system shown in FIG. 2a.

DETAILED DESCRIPTION OF THE PREFERRED EMBODIMENTS

The present invention is particularly suited for imaging and decoding optical codes corresponding to a wide range of standardized 1-D and 2-D symbologies. The present invention can be incorporated within various devices, such as handheld computers, mobile phones, etc. for image processing and analysis. The present invention is discussed with a particular emphasis on illuminating DPM codes for the purpose of imaging, reading and decoding the DPM codes, especially DPM codes imprinted or displayed on reflective surfaces such as polished metallic and glass surfaces, and optical codes displayed on display screens, such as LCD display screens of mobile phones, PDAs and laptop computers, and CRT displays used in television sets and computer monitors.

Figure 1A:
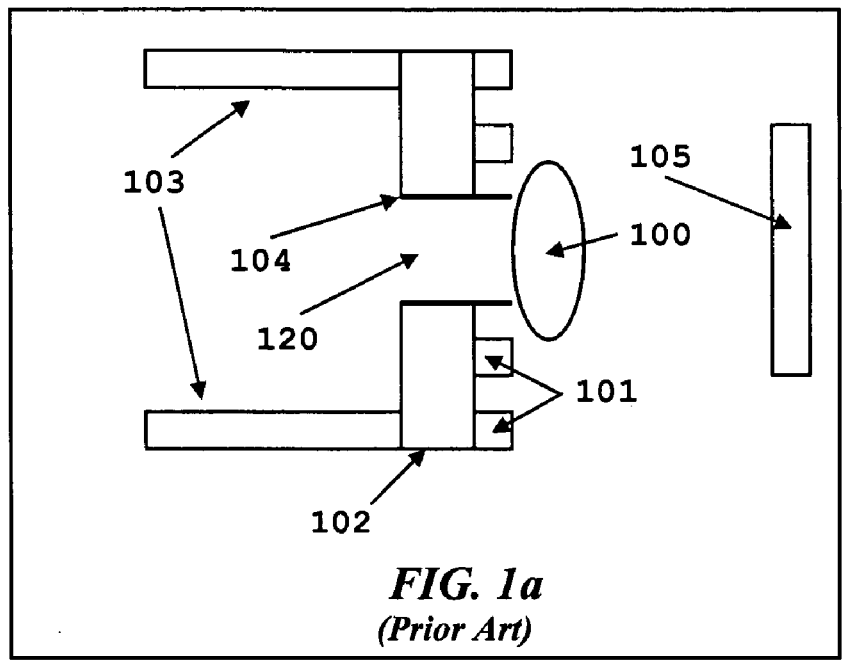
FIGS. 1a–b are block diagrams of two prior art direct part marking (DPM) optical code reading systems.
Figure 1B:
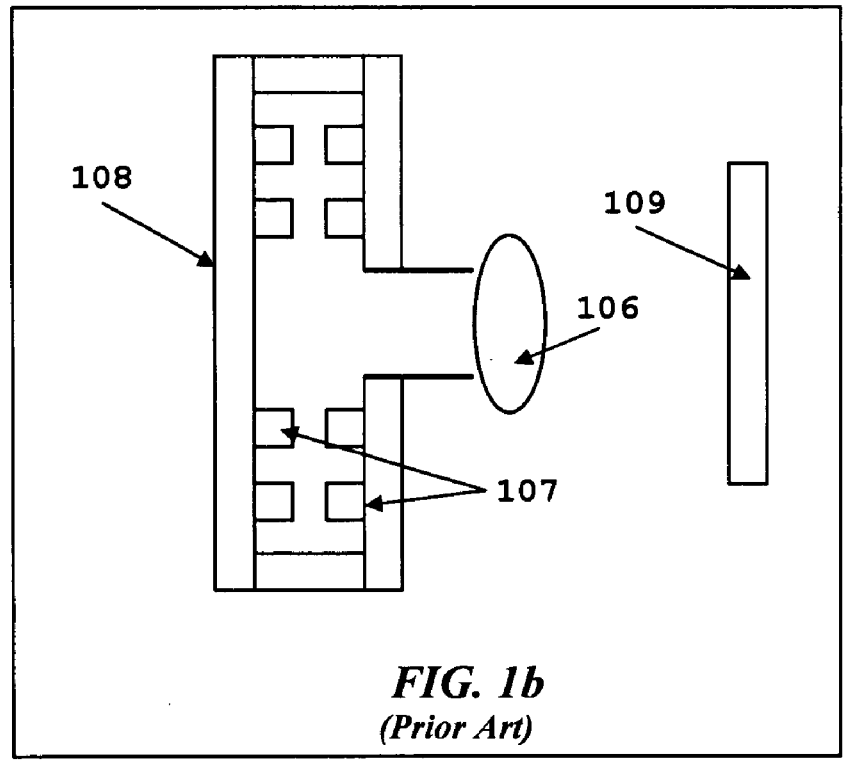
Figure 2A:
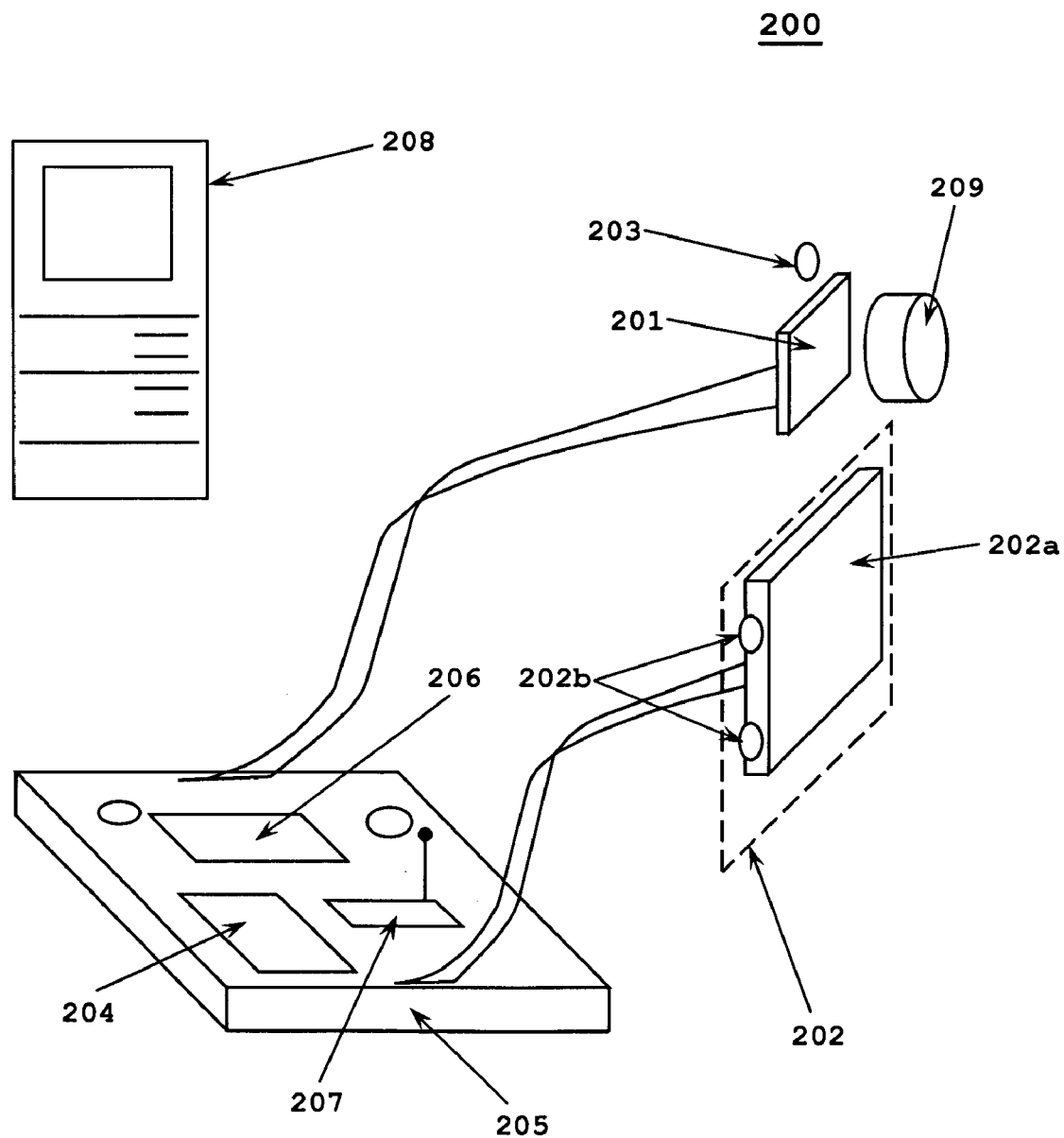
FIG. 2a is a schematic diagram of internal components of a DPM optical code reading system in accordance with the present invention.

With reference to FIG. 2a, there is shown an optical code reading system according to the present invention and designated generally by reference numeral 200. The system 200 includes an image sensor 201, such as an array of photo detectors, a CCD or a CMOS color image sensor, and an extended light source 202 having at least one lightpipe 202a, and at least one light source 202b coupled to the lightpipe 202a. The extended light source 202 is configured as either a frontlight or backlight assembly, as conventionally used in display screens of computing devices such as handheld computer devices, PDAs, mobile phones, etc., and discussed in greater detail below with respect to FIGS. 2b and 2c. The system 200 is shown with two LED light sources 202b, illustrating a configuration using multiple LEDs. The system 200 is capable of imaging a variety of optical code symbologies, including UPC, Data Matrix, QR codes, etc.

Light sources for backlights and frontlight assemblies commonly use cold-cathode fluorescent light (CCFL) bulbs as their light sources, which typically are fragile, require a high voltage drive and react slowly to on-off controls. It is preferable to provide the extended light source 202 with light source(s) 202b that are rugged, easy to drive with low voltages, and capable of reacting more quickly to on-off controls. Accordingly, it is preferable to use LEDs for the light source(s) 202b, however other types of light sources (e.g., fluorescent, incandescent, etc.) may be used instead or in combination with the LEDs.

The lightpipe(s) 202a are preferably complex lightpipe(s) that differs from common diffusing surfaces. One fundamental difference is that a diffusing surface randomly scatters incoming light into a range of angles (similar to a piece of paper). The lightpipe(s) extend the light generated by the point or linear extended light source 202b for generating at least one area extended light-beam, preferably a uniform extended light-beam.

Additionally, the system 200 includes a second light source providing narrow-beam (nearly point source) illumination, preferably an LED acting as a direct point light source 203. Furthermore, the system includes at least one processor 204 providing the decoding functionality for processing and decoding imaged optical codes, and providing additional control functions. The at least one processor 204 is situated on a logic board 205 having the necessary support circuitry for data storage 206 and communication 207 with external systems 208, such as a host computer, printer, etc. An auto-focus assembly 209 may also be provided for automatically focusing light reflected from a target optical code onto the image sensor 201, as known in the art. The LEDs 202b are positioned adjacent to the lightpipe 202a in a manner known in the art for providing a backlight illumination. When the extended light source 202 is configured as a frontlight assembly, the at least one light source 202b combination is configured as an LED assembly having either an LED bar or a lightpipe and LED combination, which are described below with respect to FIGS. 7, 8a and 8b. When imaging an optical code displayed on a reflective surface, such as a metallic surface or an LCD or CRT display, the extended light source 202 often can provide better illumination. The direct point light source 203 is particularly well suited for providing dark-background illumination, such as with a polished surface turned at an angle. In many cases, illumination from the extended light source 202 and the direct point light source 203 are automatically used alternately in quick succession in a round-robin fashion, such as alternately for consecutive imaging captures, so that images produced using both types of illumination are available for further processing if desired.

Figure 2B:
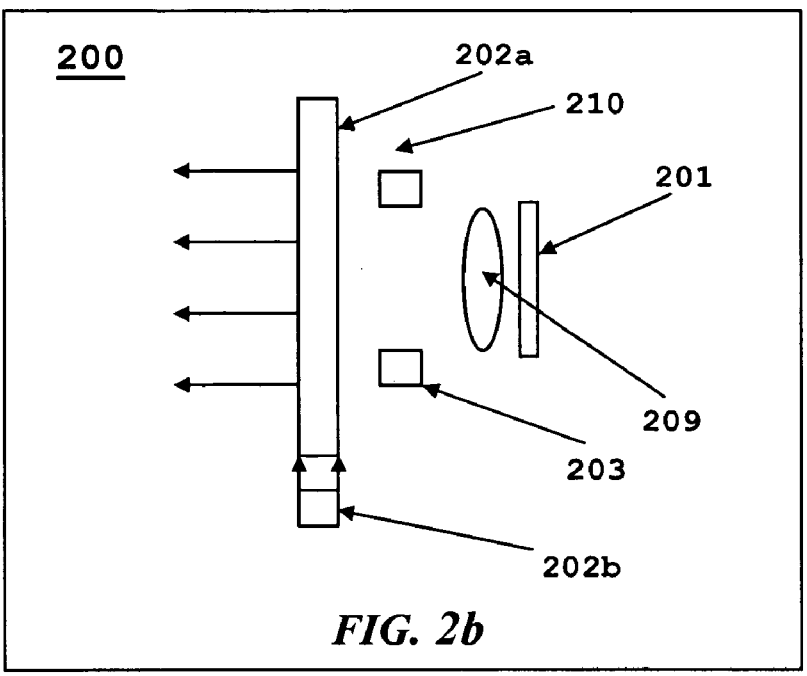
FIGS. 2b–c are block diagrams of respective embodiments of an imaging and illumination apparatus of the DPM optical code reading system in accordance with the present invention.

As shown in FIG. 2b, an alternate implementation of the embodiment shown in FIG. 2a using a frontlight assembly 210. Preferred configurations for an assembly used for light source 202b and lightpipe 202a are described below with repect to FIGS. 7, 8a and 8b. The LED light source 202b transmits light substantially into the lightpipe 202a, which in turn transmits at least one extended light-beam effectively in one direction outward and away from the lens 209 along an optical path to the target optical code. Preferably, the extended light-beam travels directly from the lightpipe 202a to the target optical code, i.e., without being reflected for redirection, and where the optical path is preferably a straight path. The direct illumination LED light source 203 transmits a narrow-beam, through the frontlight assembly 210 to illuminate the target optical code. Light sources 202b and 203 are used selectively, under the control of processor(s) 204. When reading codes displayed on a mobile-phone screen, or other reflective surface, the direct illumination LED light source 203 is often not required. The frontlight assembly 210 can be designed to couple light from the LED 202b in an efficient manner, and to output substantially uniform light.

Figure 2C:
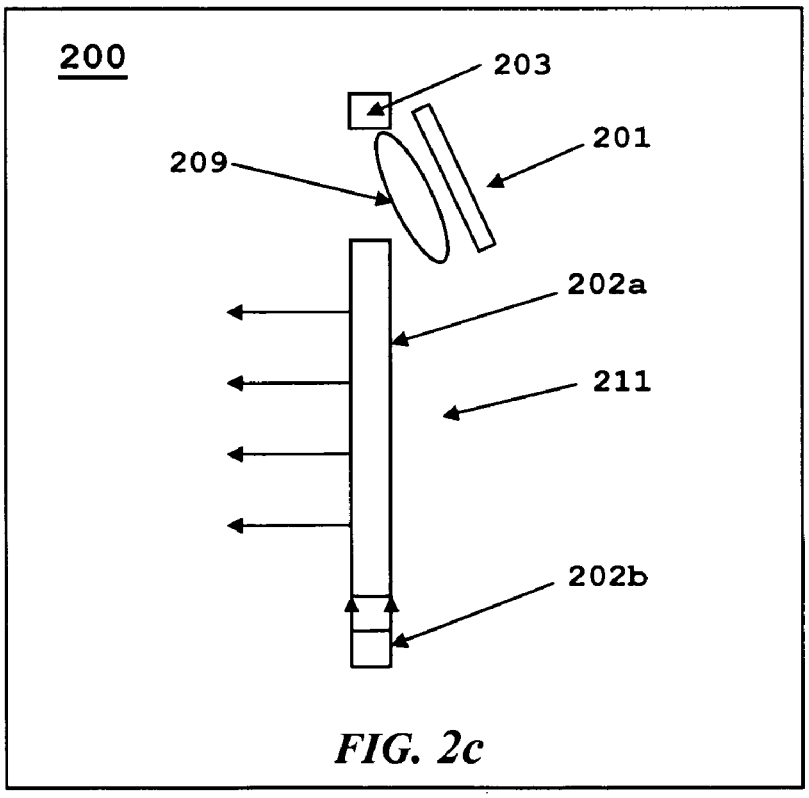

Another configuration of the embodiment in FIG. 2a using a backlight assembly 211 is shown in FIG. 2c. The backlight assembly 211 is not transparent, therefore the image sensor 201, lens 209 and light source 203 are positioned to not reside behind the backlight assembly 211. The lens 209 and image sensor 201 are shown slanted, such that an object directly in front of the backlight assembly 211 is imaged properly in the center of the field of view of the camera (i.e., the lens 209 and image sensor 201). One or more mirrors or lightpipes (not shown) may be included for redirecting light reflected from the target optical code toward the lens 209 and/or the image sensor 201, where the lens 209 is positioned for directing the reflected light to the image sensor 201. In this way, the image sensor 201 and lens 209 may be positioned behind the backlight assembly 211. Furthermore, the backlight assembly 211 may be assembled behind an LCD as an illumination source for the LCD. In such a case, when the backlight is used for illumination of the object being imaged, rather than for illumination of the displayed content of the LCD, the LCD is configured to transmit a maximum amount of light (i.e., all pixels of the LCD set to the highest white level).

The backlight assembly 211 of FIG. 2c may alternatively be a frontlight which is used together with an LCD as described above with respect to the backlight assembly 211. Although the frontlight itself is transparent, the LCD has a non-transparent mirror positioned on a rear face that reflects light forwards. Accordingly, similar to the backlight and LCD combination described above, neither the camera nor illumination source can be positioned directly behind the frontlight when used in combination with the LCD. The frontlight is preferably positioned such that its light output is directed backwards towards the LCD (towards the right side of FIG. 2c, thus preventing a camera from being positioned there.

Likewise, one or more mirrors or lightpipes (not shown) may be included for reflecting light emitted by the light source 203, so that the light source 203 may be positioned behind the backlight assembly 211 and the light emitted by the light source 203 may be directed towards the target optical code. The backlight assembly 211 can, as known in the art, incorporate a mirror (not shown) on the back, which can provide an efficient and economical design. Through the use of mirrors, the optical code may be positioned in a more centralized position with respect to the backlight assembly 211 for ease of aiming. As previously stated, light sources 202b and 203 are used selectively under the control of a processor(s) 204. When reading codes displayed on a mobile-phone screen, or other reflective surface, the direct illumination LED light source 203 is often not required and may be either disabled by the processor(s) 204 or not included in the system.

In both configurations of the embodiment shown in FIGS. 2b and 2c, the light emitted by the frontlight assembly 210 or the backlight assembly 211 is preferably emmitted for direct illumination of the target optical code, i.e., without reflection of the emitted light for the purpose of redirecting the emitted light before reaching the optical code, and where the emitted light preferably follows a straight path from the frontlight assembly 210 or the backlight assembly 211 to the target optical code. Accordingly, an efficient and compact design can be realized, such as for use in handheld computer devices, while providing efficient and effective illumination of the optical code.

The system 200 may include the frontlight assembly 210 or backlight assembly 211, where at least one light source 202b is associated with the frontlight assembly 210 or backlight assembly 211 in accordance with design, and one or more direct illumination LED light sources 203 are included, such as in accordance with the configurations shown in FIGS. 2b and 2c.

Figure 3:
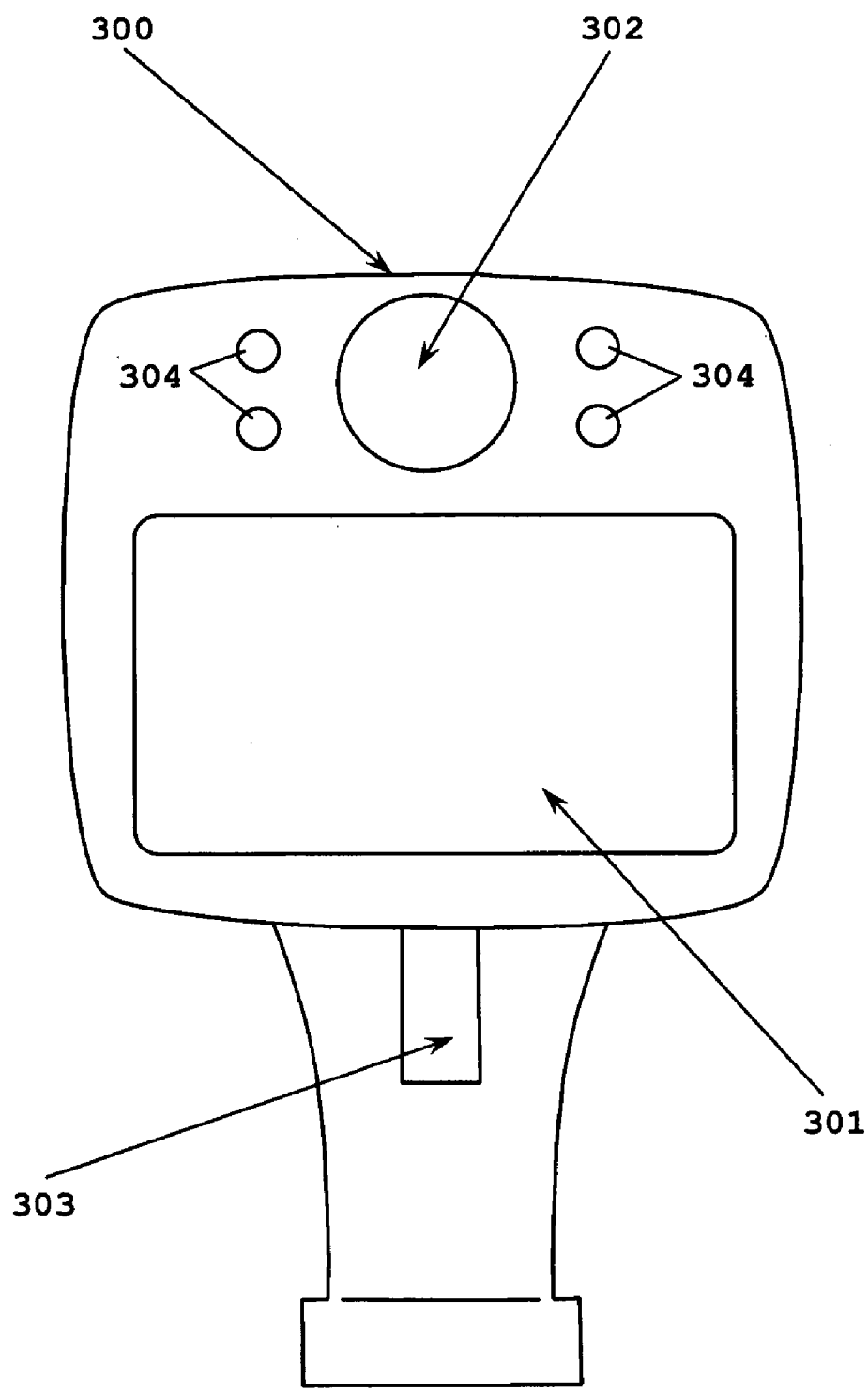
FIG. 3 is a frontal view of a handheld DPM optical code reading unit incorporating the DPM optical code reading system of the present invention.

FIG. 3 illustrates a DPM optical code reader handheld unit 300 housing the various components of the present invention as shown in FIGS. 2a–c. The handheld unit 300 is configured and dimensioned as a "pistol form factor" commonly employed in the field of optical code readers. The front section of the handheld unit 300 provides an image sensing assembly 302 (i.e., camera, preferably digital), one or more direct point light sources (such as LEDs) 304 and a backlight assembly 301. However, as discussed previously, the handheld unit 300 may include a frontlight assembly instead of the backlight assembly 301, in which case the image sensing assembly 302 may be positioned behind the frontlight assembly (see FIG. 2b). DPM scanning is initiated by depressing the trigger 303, which activates the backlight assembly 301 and image sensing assembly 302. Communication between the handheld unit 300 and a host computer, etc. may be provided by either a wireless system or an interface cable for transferring data. The wireless version is equipped with a battery power supply, preferably rechargeable, while the interface cable version can obtain the required power via conductors within the cable.

Additionally, controls (not shown) may be added to the handheld unit 300 allowing the operator to select between the two illumination methods. Alternatively, the two types of illumination (i.e., backlight assembly 301 and direct point light sources 304) may be switched automatically (i.e., alternately activated) in successive image captures. It is further contemplated that the selection process is automatic in accordance with a determination of at least one optical property, useable as a reflectivity and/or readability metric, of the code being imaged. At least a portion of a first image may be obtained and processed by a processor(s), disposed within the handheld unit 300 or the host computer, for analyzing the optical property and controlling the direct point light source (if present) and the backlight assembly 301 (or frontlight assembly if included) for selective activation of the light emitted by the backlight assembly 301 (or frontlight assembly if included) and/or the direct point light source.

The frontlight/backlight assembly 301 also may be color adjustable, providing the operator with a number of illumination colors. The various illumination colors are provided for functional purposes; codes imprinted on certain surfaces may be more visible under one wavelength of light than under another, thus the providing of multiple wavelengths allows the operator to select the color best suited for the particular application.

Figure 4:
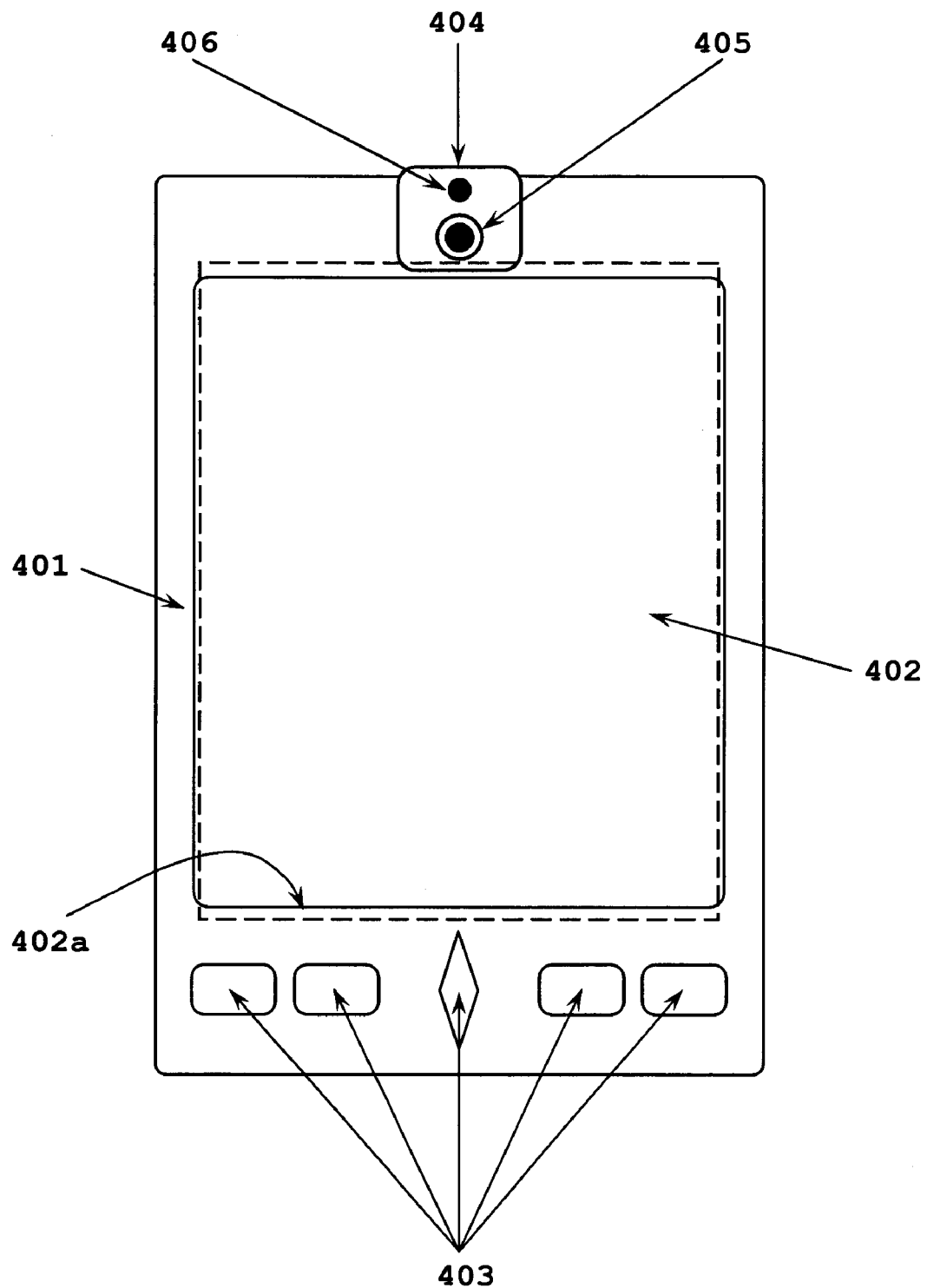
FIG. 4 is a handheld computer device satisfying a PDA form-factor, incorporating the DPM optical code reading system in accordance with the present invention.

In an alternate embodiment, as illustrated in FIG. 4, the present invention is incorporated within a handheld computer device 400, and preferably fits within a form factor of the handheld computer device 400, such as a PDA form-factor. A handheld computer device housing 401 houses digital camera 405, possibly at least one direct point light source 406, and an LCD screen 402 that is backlit by a backlight assembly 402a (or frontlit by a frontlight assembly). The camera and the point light source 406 may optionally be mounted on a swivel base to benefit image and video capturing functionalities. If such a swivel base is provided, however, it is envisioned that a "locked" position, with tactile feedback is provided, such that the camera is quickly restored to a predefined preferred position for using the frontlight/backlight as an illumination source. Additionally, the handheld computer device housing 401 has a user input means, such as buttons 403, and may have a touch sensitive membrane (not shown) overlaying the LCD screen 402. The built-in camera 405 may advantageously be equipped with an auto-focus system as known in the art and the at least one direct point light 406 source may be used as an illumination and or red-eye reduction device when used for digital photography, while not in use as an optical code scanner.

Alternatively, the camera 405 may be equipped with a dual-focus system, as described in commonly owned U.S. patent application Ser. No. 10/405,812 by Dvorkis, filed on Apr. 2, 2003; U.S. Published Application No. 2002/0148900 by Gurevich et al., filed on Apr. 13, 2001; and U.S. Pat. No. 6,336,587 by He et al., issued on Jan. 8, 2002 and U.S. Pat. No. 6,340,114, by Correa et al., issued on Jan. 22, 2002. The dual-focus system would allow, for example, the use of near focus for DPM scanning, which usually needs higher magnification, while the use of far focus is advantageous for scanning regular sized 1-D or 2-D barcodes, such as those commonly used on regular-sized product labels.

The handheld computer device 400 additionally is in communication with or includes processing means, storage means and software for controlling the backlight (or frontlight) assembly 402a, direct point source 406 and built-in camera 405, and for processing and decoding the signals corresponding to the code images generated by the built-in camera 405. Steps performed by the software are illustrated in greater detail in a flowchart shown in FIG. 6 and described below.

Figure 5:
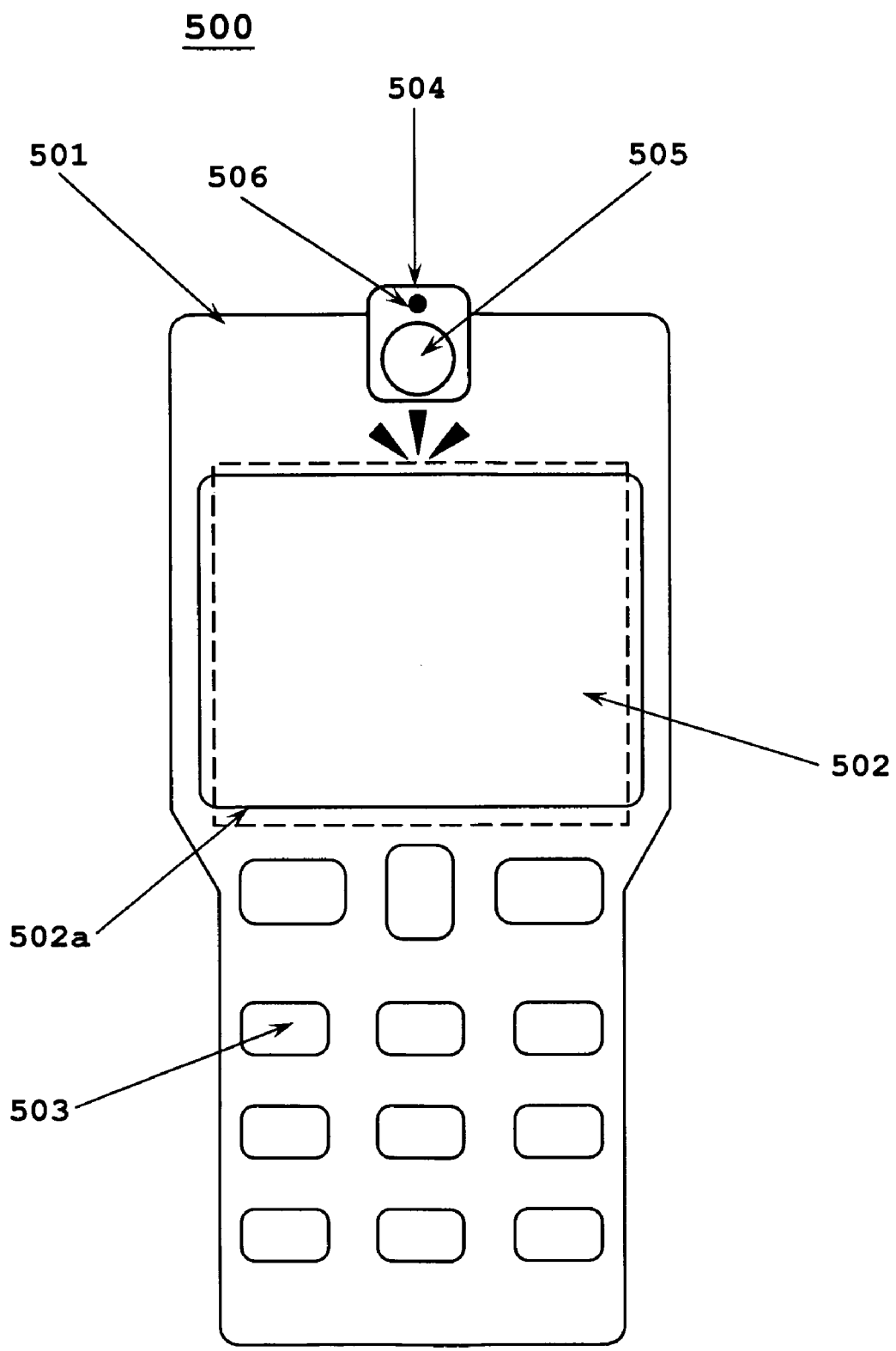
FIG. 5 is a mobile phone device incorporating the DPM optical code reading system in accordance with the present invention.

In another embodiment, the present invention is part of a cellular phone 500 as shown in FIG. 5. The cellular phone housing 501 houses an assembly 504 having a camera 505 and at least one direct point light source 506. In addition to the assembly 504, a display screen 502 (e.g., LCD, OLED, etc.) backlit by a backlight assembly 502a (or frontlit by a frontlight assembly) are disposed within the cellular phone housing 501. The assembly 504 is, preferably, swivel-able so that the camera and/or direct point light source can be physically aimed independent of the cellular phone housing. As in the case for handheld computers, the cellular phone design would also provide a "locked" position for the camera to best utilize the backlight/frontlight assembly 502a that is integrated with the display screen 502. Additionally the cellular phone housing 501 has a user input means such as a keypad 503 for providing user interaction with the cellular phone 500.

The cellular phone 500 further includes or is in communication with processing means, storage means and software for controlling the backlight (or frontlight) assembly 502a, direct point light source 506 and built-in camera 505, and processing and decoding signals corresponding to images generated by the built-in camera 505. The steps performed by execution of the software are illustrated in greater detail in the flowchart shown in FIG. 6 and described below.

Figure 6:
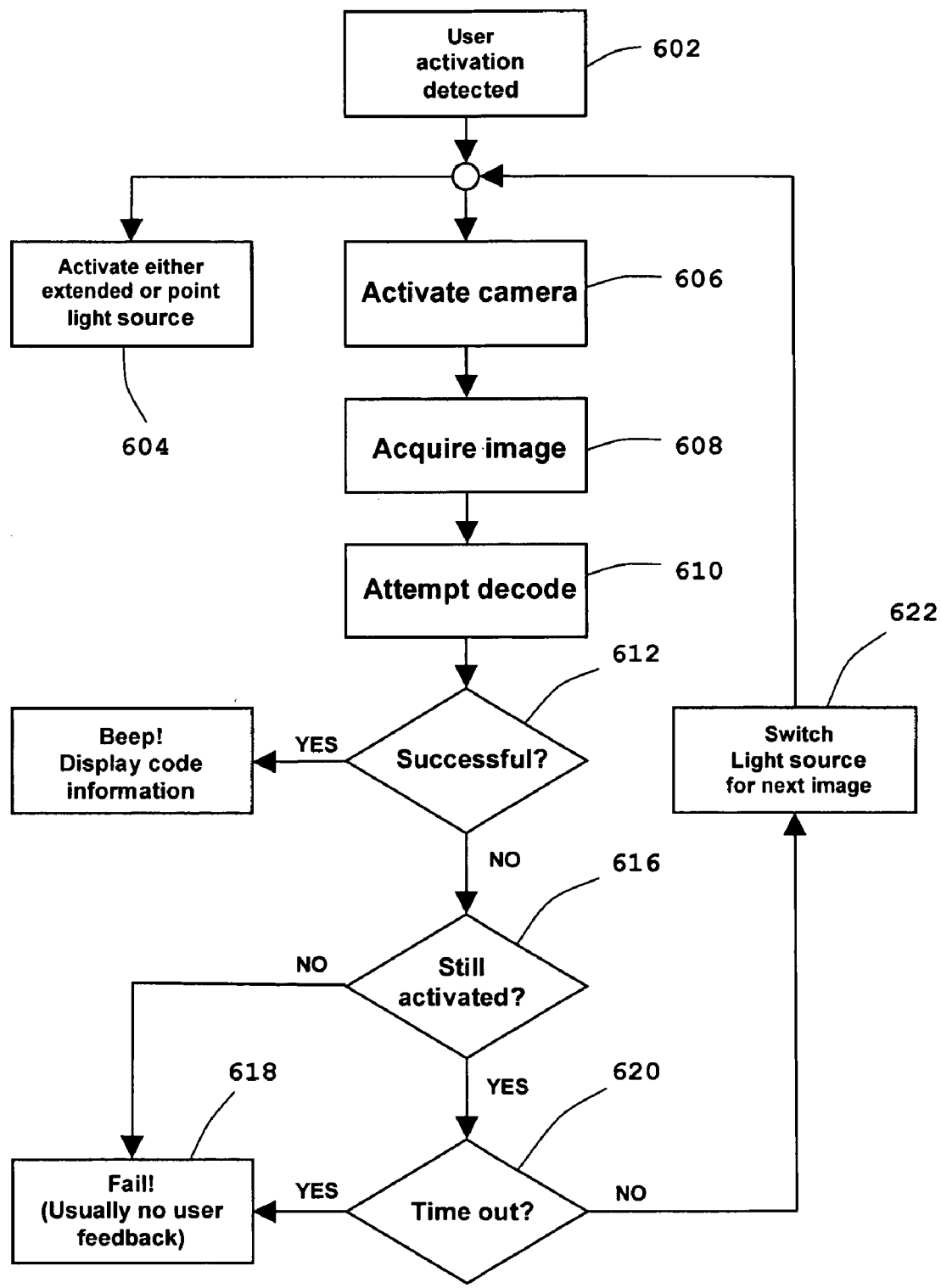
FIG. 6 is a flow chart illustrating a method of illuminating, imaging, reading and decoding optical codes in accordance with the present invention.

FIG. 6 shows the flowchart illustrating the steps performed during an exemplary image capture (i.e., image acquisition and decoding attempt) by execution of software by a processor included or in communication with an optical code scanning device, such as the handheld computer device and cellular phone embodiments of the present invention. The software may be stored on a computer readable medium or transmitted as propagated signals embodied in a transmission medium. The description below refers to the handheld computer device embodiment, but applies equally to the cellular phone embodiment also. At step 602, the scanning process for scanning an optical code is initiated by detection of user activation through actuation of a user activation means, such as a predefined button from the set of several buttons 403 or a trigger, such as trigger 303 shown in FIG. 3. At step 604, the display may be cleared if necessary, and a selected illumination source of one of the backlight/frontlight assembly 402a or the direct point light source 406 is activated. At step 606, which is substantially simultaneous with step 604 so that the illumination by the selected source is still provided, the camera 405 is activated. At step 608, an image is acquired. At step 610, the image is decoded using an appropriate decoder algorithm retrieved from internal memory, such as in accordance with a code-type recognized during the decode process. At step 612, a determination is made if the decode attempt in step 610 was successful. If so, step 614 is executed, and feedback is provided to the user indicating that a successful decode was executed and the decoded code is displayed to the user via display screen 402.

If the decode was not successful, control passes to step 616, where a determination is made if the user activation means is still actuated. If the determination from step 616 is "no", step 618 is executed, and the decoding session fails, i.e., is aborted. Usually no particular user feedback is provided at step 618, as the user can immediately notice the cessation of illumination activations. If the determination of step 616 is "yes", step 620 is executed, in which a determination is made if a predetermined time limit has been exceeded. If the time limit was exceeded, step 618 is executed, and the decoding session is aborted, which is for prevention of accidental activations, such as when the activation button is depressed while the device is in a briefcase. If the time limit is not yet exceeded, step 622 is executed, in which a determination is made as to whether to select the backlight/frontlight assembly 402a or the direct point light source 406 for activation. The determination could be made either based on image analysis of previously acquired images (as discussed below), or on a predetermined selection pattern, such as alternating between the backlight/frontlight assembly 402a or the direct point light source 406 for successive image acquisition and decoding attempts. Control returns to steps 604 and 606 so that the selected illumination source and the camera are activated for another image acquisition and decoding attempt. Accordingly, activation of the illumination source is alternated between the backlight/frontlight assembly 402a or the direct point light source 406 for each successive image operation, until either a successful decode or a failure, such as due to a timeout condition, occurs, upon which the image operation is discontinued.

It is contemplated that during an imaging operation a quality determination is made for of at least one optical property of the code and/or background being imaged, such as reflectivity, contrast level, gloss/glare, color, etc., as well as whether the code is luminous, i.e., displayed on a screen such as a CRT, LCD or OLED screen. Selection of the illumination source and/or a color of light emitted by the selected illumination source may be made in accordance with the at least one optical property quality of the optical code being imaged determination and/or a manually entered user input. Additionally, the handheld computer device and associated software can be configured to provide added functions, such as: providing interactivity with a remote host computer via wireless communications for updating coded part information, providing connectivity to a printer, etc.

Figure 7:
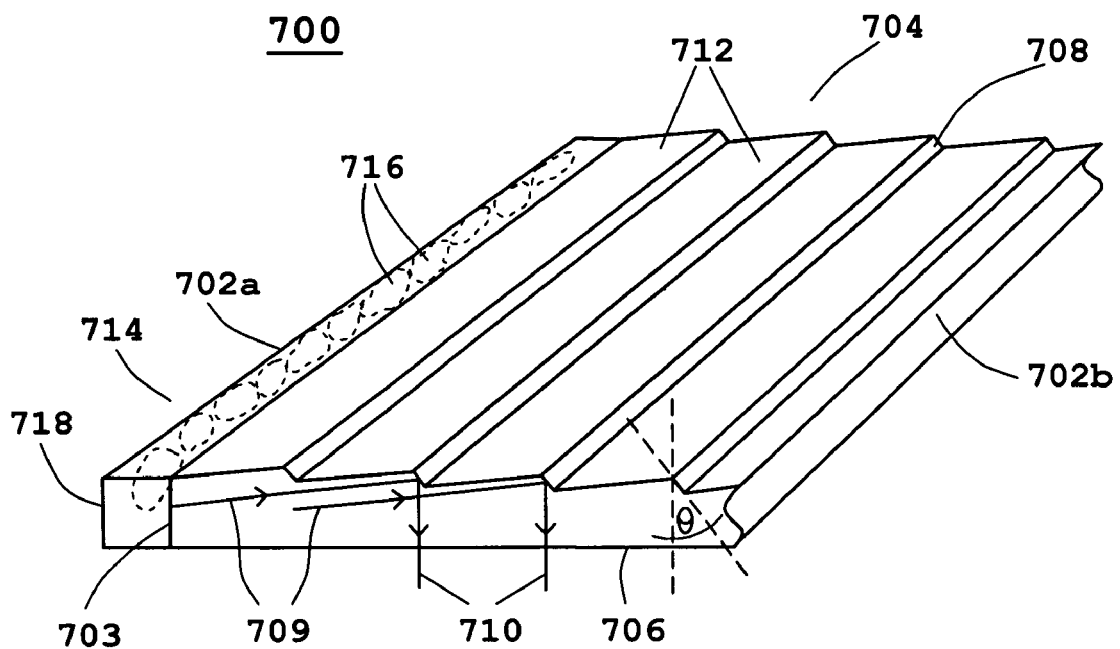
FIG. 7 is a perspective view of one embodiment of a light source assembly for use with a frontlight in accordance with the present invention.

With reference to FIG. 7, a lightpipe 702b and light source 702a are combined to form a frontlight assembly 700 such as for use as the frontlight assembly 210 shown in FIG. 2b. The frontlight assembly 700 is used in place of frontlight assembly 202 of FIG. 2a and frontlight assembly 210 of FIG. 2b. The light source 702a is positioned to be adjacent to and extend along a side face 703 of the lightpipe 702b. The lightpipe 702b has a first and second primary surface 704, 706, where the first primary surface 704, as known in the art, includes numerous minute flat strips 708 having polished surfaces which function similarly to an array of tiny strips of mirrors. The polished surfaces are configured and positioned to receive incoming light generated from the light source 702a at a first predetermined angle, and reflect the light at a second predetermined angle. The light generated by the light source 702a enters the lightpipe 702b through side face 703 and exits the lightpipe 702b from the second primary surface 706, where the surface area of the second primary surface 706 is substantially greater than the surface area of the side face 703.

Using a method known as Total Internal Reflection (TIR), or a mirrored surface, incoming light, indicated by arrow 709, which is provided by the light source(s) 702a, passes through the side face 703, and is directed by the strips 708 to exit from the second primary surface 706, as indicated by arrows 710. In the example shown, the strips 708 are tilted from the vertical at an angle θ, where θ is 45 degrees, in order that the light provided by the light source(s) 702a is directed by the strips to exit from the second primary surface 706 in a direction that is substantially perpendicular to the second primary surface 706, as indicated by arrows 710. Furthermore, the first primary surface 704 is provided with a series of wedges 712 of uniform width, each positioned parallel to the second primary surface 706 or at substantially the same slight angle thereto, where the angle is considerably less than 45 degrees for providing an unobstructed light path in the direction indicated by arrows 709. Gaps between the strips 708 are small, preferably on the order of 0.1 mm, such that light output from the frontlight assembly 700 appears to be continuous to the human eye and to the digital camera.

The light source 702a includes at least one LED based light source including a plurality of LEDs preferably configured to produce a bright and uniform line of light that is oriented towards the lightpipe 702b. The line of light is similar in uniformity to the light produced by a CCFL bulb. In the embodiment shown, the light source 702b includes at least one LED light bar 714 having individual LEDs 716 packaged into a single housing 718 that is shared by the individual LEDs 716. Non-illuminating borders between LEDs are minimized for producing a uniform sheet of light, and in the case where the LEDs 706 are white LEDs, the non-illuminating border areas are substantially eliminated since the white LEDs are made with blue LED cores and a fluorescent phosphor material which acts as a diffuser in the process of re-emitting light in the wide light spectrum. The light source 702a is compact and maybe positioned adjacent to the lightpipe 702b without wasted space, providing a compact and efficient design for the frontlight assembly 700.

FIGS. 8a–f show various embodiments of a frontlight assembly or a light source for a light assembly (e.g., a frontlight or backlight assembly) that generates an extended-beam light, which includes a lightpipe and a light source. The lightpipe includes an array of first portions and an array of second portions, wherein the first portions of the array of first portions alternate with second portions of the array of second portions. The light source includes a light source formation having an array of first light sources generating an array of corresponding first light beams directed at respective first portions, and an array of second light sources generating an array of corresponding second light beams directed at respective second portions, wherein the first light beams of the array of first light beans alternate with and are staggered with the second light beams of the array of second light beams. At least one of respective first portions of the array of first portions and respective second portions of the array of second portions include at least one slanted surface, wherein the at least one slanted surface of the respective first portions is slanted with respect to the first light beams, and the at least one slanted surface of the respective second portions is slanted with respect to the second light beams, The slanted surfaces redirect at least one of the first light beams and the second light beams in order that gaps between adjacent first and second light beams are substantially eliminated for combining the array of first light beams and the array of second light beams into a continuous light beam which is output by the lightpipe as an extended-beam light.

Figure 8A:
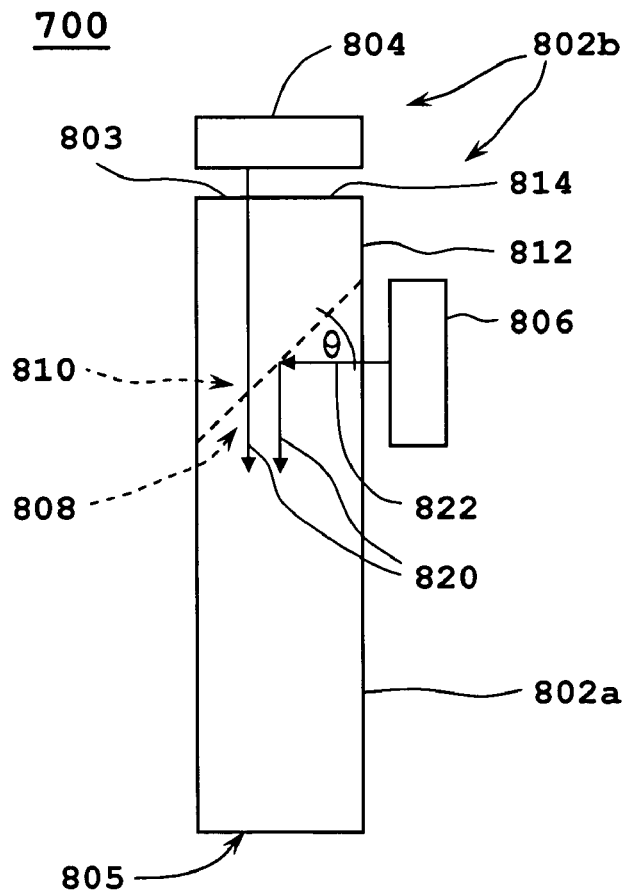
FIG. 8a is a side view diagram of another embodiment of a light source assembly for use with a frontlight in accordance with the present invention.
Figure 8B:
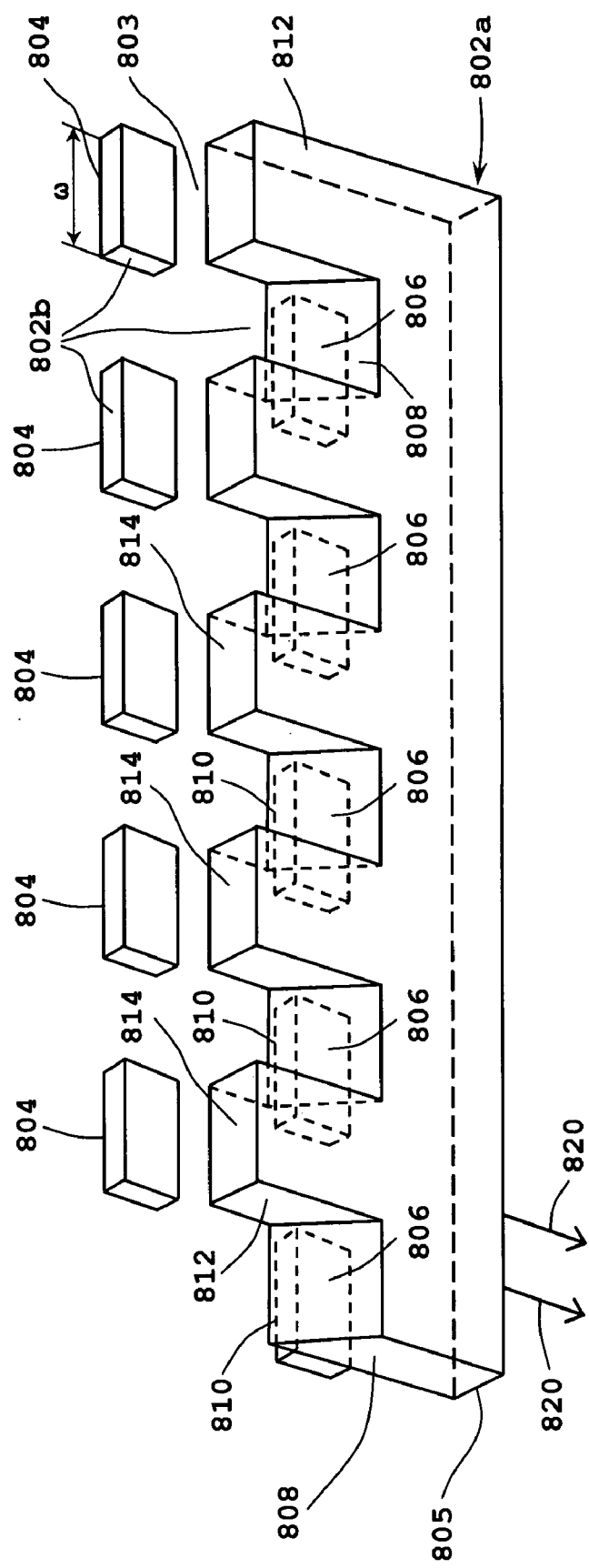
FIG. 8b is a perspective-projected view of the light source assembly shown in FIG. 8a, approximately rotated 90 degrees counterclockwise.

FIGS. 8a and 8b shows an embodiment of a light source assembly for a frontlight assembly, such as extended light source 200. A light source assembly 800 is shown having a lightpipe 802a and a light source 802b. A back end 803 and a front end 805 of the lightpipe 802a are shown. The light source 802b includes an array of first light sources 804 and an array of second light sources 806, each array of light sources having at least one light source. The first and second light sources 804 and 806 are herein referred to as LEDs, but are not limited thereto. In effect, light beams produced by the array of first LEDs 804 alternate with and are staggered with light beams produced by the array of second LEDs 806, such that any gap in light caused by non-illuminating borders of individual LEDs of either of the arrays is covered by light produced by the other array of LEDs.

Effective elimination of light gaps is achieved by providing the lightpipe 802a with slanted portions 808 having respective slanted surfaces 810 utilizing total internal reflection (TIR), or a mirrored surface, which are positioned between columns 812 having flat surfaces 814. The array of second LEDs 806 is positioned behind the slanted portions 808 and the array of first LEDs 804 is positioned above the columns 812. The lightpipe 802a may be constructed of one piece of material having the columns 812 and the slanted portions 808.

In the example shown, the array of first LEDs 804 is positioned above respective columns 812 for directing light through the flat surface 814 and directing the light towards the front end 805 of the LED assembly 800 as indicated by arrow 820. The array of second LEDs 806 (shown in phantom in FIG. 8b) and the slanted surface 810 are oriented so that light transmitted by the array of second LEDs 806 indicated by arrow 822 is directed towards the slanted surface 810 at an angle θ, where θ is preferably approximately 45 degrees but not limited thereto, from where the light is directed towards the front end 805 of the light source assembly 800, as indicated by arrow 820. The array of first LEDs 804 and/or the array of second LEDs 806 may contact or be adjacent to the lightpipe 802a.

The LEDs of the array of first LEDs 804 and/or the array of second LEDs 806 have an effective width "w" (i.e., generate a light beam having a width "W") that is sufficient to extend at least to the edge of adjacent column or slant portions 808, 812 on either side for preventing gaps in the light transmitted in the direction indicated by arrows 820. The lightpipe 802a and light source 802b are configured and positioned so that the respective first LEDs 804 may have an effective width "w" that is greater than the width of the column 812 above which it is positioned, and/or the respective second LEDs 806 may have an effective width "w" that is greater than the width of the slanted portion 808 behind which it is positioned. The width of first and second LEDs 804, 806 is sufficient so that there is not a gap in the light output of the lightpipe 802a corresponding to the light generated by adjacent first and second LEDs 804, 806.

The light source assembly 800 is compact, and may further be positioned adjacent and parallel to another lightpipe, such as the lightpipe 202a of the extended light source 200 shown in FIG. 2 (instead of light source 202b shown) or the lightpipe 702b of the frontlight assembly 700 shown in FIG. 7 (instead of light source 702a). Accordingly, a strong and uniform line of light is provided to a lightpipe (e.g., 202a or 702b) for extension thereof. A minimum amount of space is consumed by each of the frontlight assembly 700 and the light source assembly 800, which thus provides a compact and efficient light source/frontlight combination. Furthermore, the lightpipe 802a and the other lightpipe (such as 202a or 702b) may be attached or formed of a single piece of material.

Figure 8C:
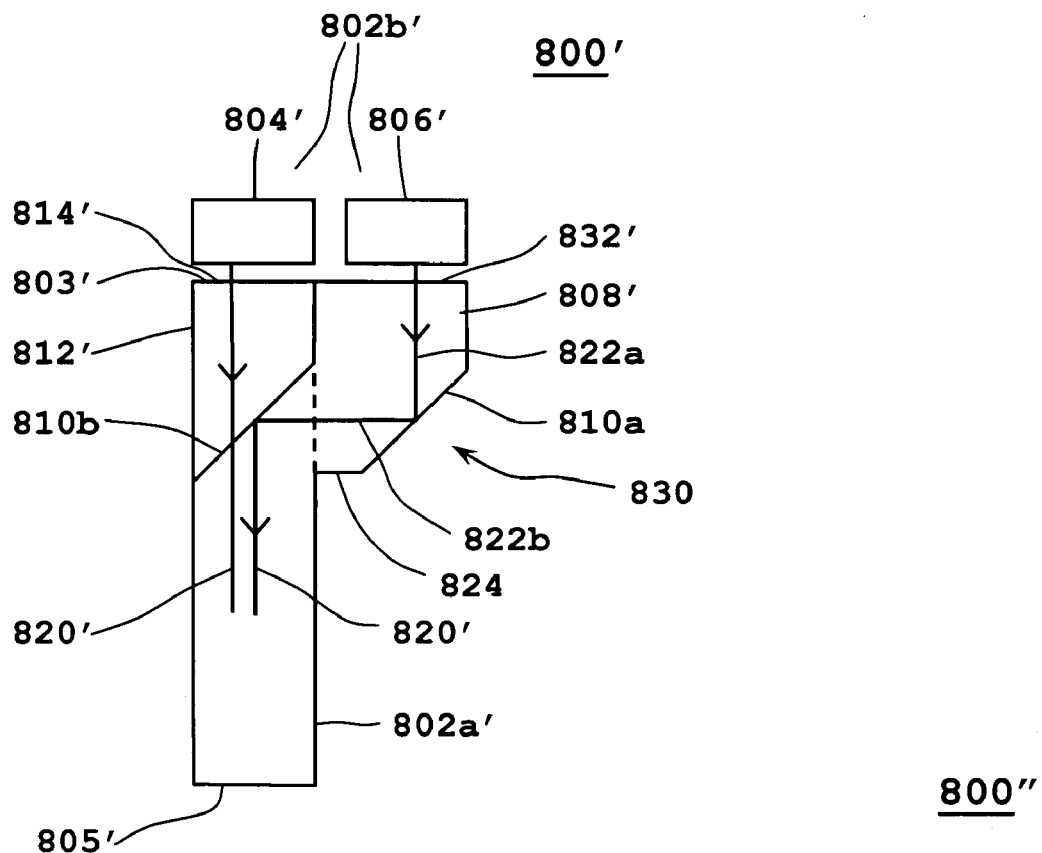
FIG. 8c is a side view diagram of another embodiment of the light source assembly shown in FIGS. 8a and 8b.
Figure 8E:
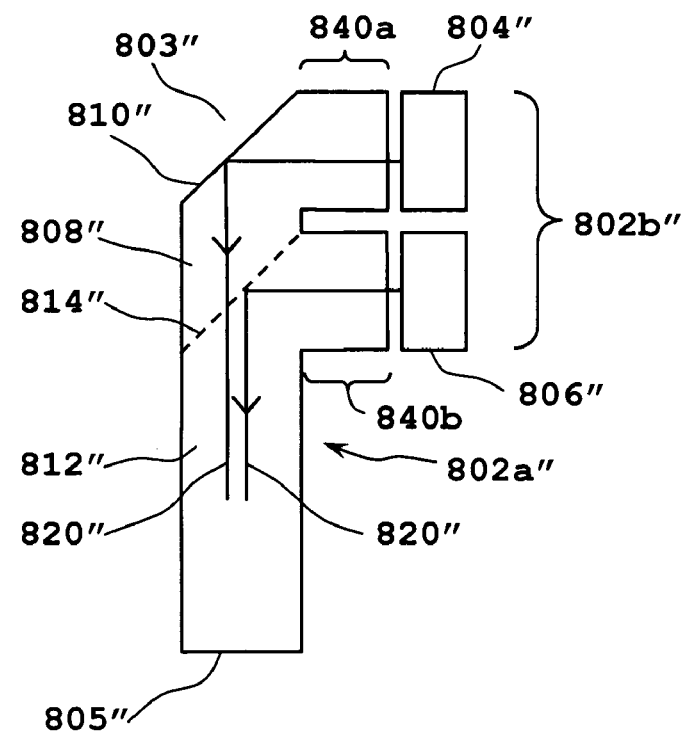
FIG. 8e is a is a side view diagram of still another embodiment of the light source assembly shown in FIGS. 8a and 8b.
Figure 8D:
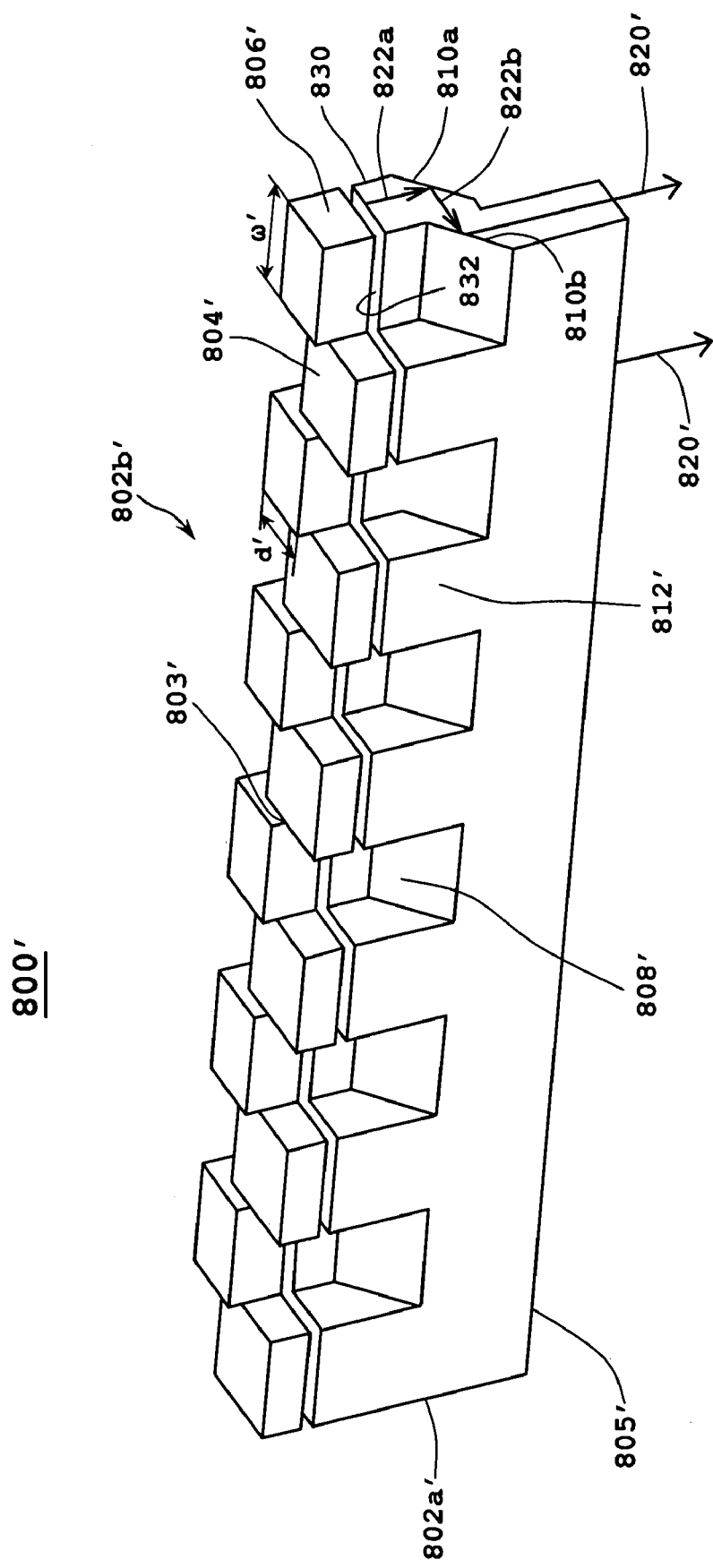
FIG. 8d is a perspective-projected view of the light source assembly shown in FIG. 8c, approximately rotated 90 degrees counterclockwise.

Another embodiment of a light source assembly 800' is shown in FIGS. 8c and 8d, where light source assembly 800' is a slight modification of the design for light source assembly 800 shown in FIGS. 8a–b, and has the advantages of the light source assembly 800. Lightpipe 802a' may be constructed of one piece of material, as is the case of lightpipe 802a. The lightpipe 802a' includes indentation portions 808' having front and back slanted surfaces 810b and 810a and a back wall 830 having a top surface 832, and raised column portions 812' having a top surface 814'.

A staggering effect is achieved for eliminating gaps in light produced by the array of first LEDs 804' and the array of second LEDs 806' and output by the lightpipe 802a', by providing the lightpipe 802a' with alternating indentation portions 808' and column portions 812', where the indentation portions 808' have respective slanted surfaces 810a' and 810b', causing TIR two times for the light generated from the array of second LEDs 806. The array of second LEDs 806' is positioned adjacent (or in contact with) the top wall 832 of the back wall 830 of the indentation portions 808'. The array of first LEDs 804' is positioned on (adjacent to or in contact with) the top surface 814' of the respective column portions 812'.

In the example shown, the array of first LEDs 804' is positioned above respective columns portions 812' for directing light through the flat top surface 814' and directing the light towards the front end 805' of the LED assembly 800' as indicated by arrow 820'. The array of second LEDs 806' and the slanted surface 810' are oriented so that light transmitted by the array of second LEDs 806' indicated by arrows 822a and 822b is directed towards the front face of the first slanted surface 810a, and is directed by the first slanted surface 810a towards the second slanted surface 810b. The light strikes the back face of the second slanted surface 810b and is directed towards the front end 805' of the light source assembly 800', as indicated by arrow 820'.

Preferably, the respective LEDs of the array of first LEDs 804' and/or the array of second LEDs 806' are dimensioned so that their effective width "w" is sufficient to extend at least to the edge of adjacent column or indentation portions 808', 812' on either side so that there is not a gap in the light output by adjacent first and second LEDs 804, 806, for preventing gaps in the light transmitted in the direction indicated by arrows 820'. The lightpipe 802a' and light source 802b' are configured and positioned so that the respective first LEDs 804' may have an effective width "w" that is greater than or exceeds the width of the column 812' above which it is positioned, and/or the respective second LEDs 806' may have an effective width "w" that is greater than or exceeds the width of the back wall 830 above which it is positioned.

Furthermore, the lightpipe 802a' and light source 802b' are configured and positioned so that the respective first LEDs 804' may have an effective depth "d" (i.e., generate a light beam having a depth "d") that is less than, greater than, or exceeds the depth of the column 812' above which it is positioned, and/or the respective second LEDs 806' may have an effective depth "d" that is less than, greater than, or exceeds the depth of the back wall 830 above which it is positioned. The array of first LEDs 804' and the array of second LEDs 806' can both be positioned in the same plane. This provides an advantage, in that the array of first LEDs 804' and the array of second LEDs 806' may be placed on one printed circuit board (PCB).

In addition, the material thickness represented by edge 824 is selectable at design time for avoidance of physical interference between the array of first LEDs 804' and the array of second LEDs 806'. For example, when the first LEDs 804' and/or second LEDs 806' have large non-illuminating border areas on their illumination faces, the edge 824 is increased for avoiding physical interference between LEDs of the array of first LEDs 804' and the array of second LEDs 806'.

It is envisioned that the lightpipe 802a' is constructed so that the back wall 830 is a continuous wall that extends along the length of the lightpipe 802', including behind consecutive column portions 812' and/or indentation portions 808'. Accordingly, the top surface 832 of the back wall 830 may be a continuous surface that extends along the length of the lightpipe 802' behind consecutive column portions 812' and/or consecutive indentation portions 808'. Furthermore, the slanted surface 810a may extend along consecutive indentation portions 808' as a continuous surface. The slanted surface 810a thus may extend behind one or more column portions, but does not interfere with or affect the optical path of the light that is directed through the column portions 812' as indicated by arrow 820'. Constructing the lightpipe 802a' with a continuous back wall 830 and/or slanted surface 810a that extends along the length of the lightpipe 802a' has advantages for simplifying the manufacturing process and providing additional mechanical strength and sturdiness.

Figure 8F:
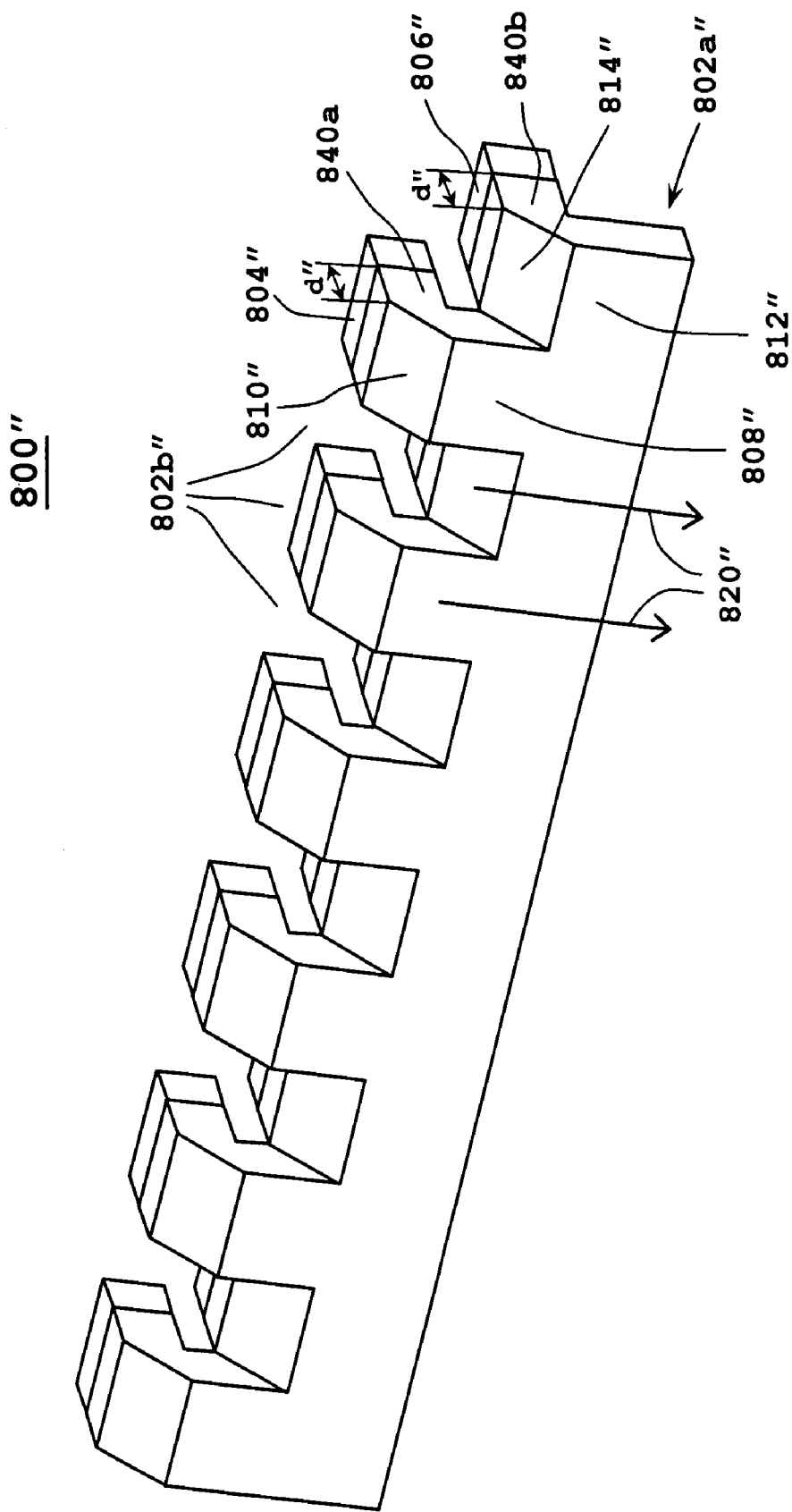
FIG. 8f is a perspective-projected view of the light source assembly shown in FIG. 8e, approximately rotated 90 degrees counterclockwise.

With reference to FIGS. 8e and 8f another variation of the light source assembly 800" is shown, where light source assembly 800" is a slight modification of the designs 800 and 800' shown in FIGS. 8a–d, and has the advantages thereof. The light source assembly 800" is shown having a lightpipe 802a" and a light source 802b". Lightpipe 802a" may be constructed of one piece of material, as is the case of lightpipe 802a. A back end 803" and a front end 805" of the lightpipe 802a" are shown. The light source 802b" includes an array of first LEDs 804" and an array of second LEDs 806" (preferably arranged in rows), each array of LEDs having at least one LED. In effect, light produced by the array of first LEDs 804" is staggered with light produced by the array of second LEDs 806", such that any gap in light caused by non-illuminating borders between individual LEDs of either of the sets is covered by light produced by the other set of LEDs.

The staggering effect and effective elimination of light gaps is achieved by providing the lightpipe 802a" with first slanted portions 808" having respective first slanted surfaces 810" utilizing total internal reflection (TIR) or a mirrored surface to redirect light, which are positioned between second slanted portions 812" having respective second slanted surfaces 814", which also utilize total internal reflection (TIR) or a mirrored surface to redirect light. The array of first LEDs 804" is positioned behind the first slanted portions 808" and the array of second LEDs 806" is positioned behind the second slanted portions 812". The lightpipe 802a" may be constructed of one piece of material having the first and second slanted portions 808" and 812".

In the example shown, the array of first LEDs 804" is positioned behind respective first slanted portions 808" for directing light towards the first slanted surface 810", which is then directed by TIR or a mirrored surface towards the front end 805" of the light source assembly 800", as indicated by arrow 820". The array of second LEDs 806" (shown in phantom in FIG. 8f) is positioned behind respective second slanted portions 812' for directing light towards the second slanted surface 814", which is then directed by TIR or redirection towards the front end 805" of the light source assembly 800", as indicated by arrow 820". The array of first LEDs 804" and/or the array of second LEDs 806" may contact or be adjacent the lightpipe 802a".

The LEDs of array of first LEDs 804" and/or the array of second LEDs 806" have an effective width "w" that is sufficient to extend at least to the edge of adjacent first or second slanted portions 808", 812" on either side so that there is not a gap in the light output by adjacent first and second LEDs 804, 806, and preferably so that light output by adjacent first and second LEDs 804, 806 overlaps one another, for preventing gaps in the light transmitted in the direction indicated by arrows 820". The lightpipe 802a" and light source 802b" are configured and positioned so that the respective array of first LEDs 804" and/or the array of second LEDs 806" may have an effective width "w" that is greater than or exceeds the width of the respective first or second slanted portion 808", 812" behind which it is positioned.

The array of first LEDs 804" and the array of second LEDs 806" can both be positioned in the same plane, thus providing the advantage of placing array of first LEDs 804" and the array of second LEDs 806" as a strip of LEDs on one PCB. Furthermore, the strip size is minimized, thus consuming less material and space. In addition, the PCB supporting the strip of LEDs may be oriented parallel to the lightpipe 802a as well as an associated lightpipe (such as 702b or 202a), which contributes to enabling one of the lightpipes 802a, 702b, 202a to further function as a window of the camera of the optical code reading system. Accordingly, the PCB, the array of first LEDs 804" and the array of second LEDs 806" do not infringe upon space that is usable for a wall supporting the window (which could be another lightpipe such as 202a) of the optical code reading system.

The respective first slanted portions 808" are provided with an extension 840a, and the respective second slanted portions 812" are provided with an extension 840b, where the extensions 840a and 840b space the first and second LEDs 804" and 806" (and an associated PCB if provided) from the plane of a back face of the lightpipe 802a", including when the lightpipe 802a" functions as the window. Accordingly, the first and second LEDs 804" and 806" (and an associated PCB, if provided) can still fit into a tight space, even when sufficient space does not exist in very close proximity to the lightpipe 802a", such as when available space is occupied, for example by wall thickness of the chassis, a mechanical seal structure for sealing the lightpipe 802a to the chassis, and support structures for the PCB. The extensions 840a and 840b each have a depth "d", where "d" is selectable (e.g., ranging from 0 to an upper limit) in accordance with design choice.

Figure 9A:
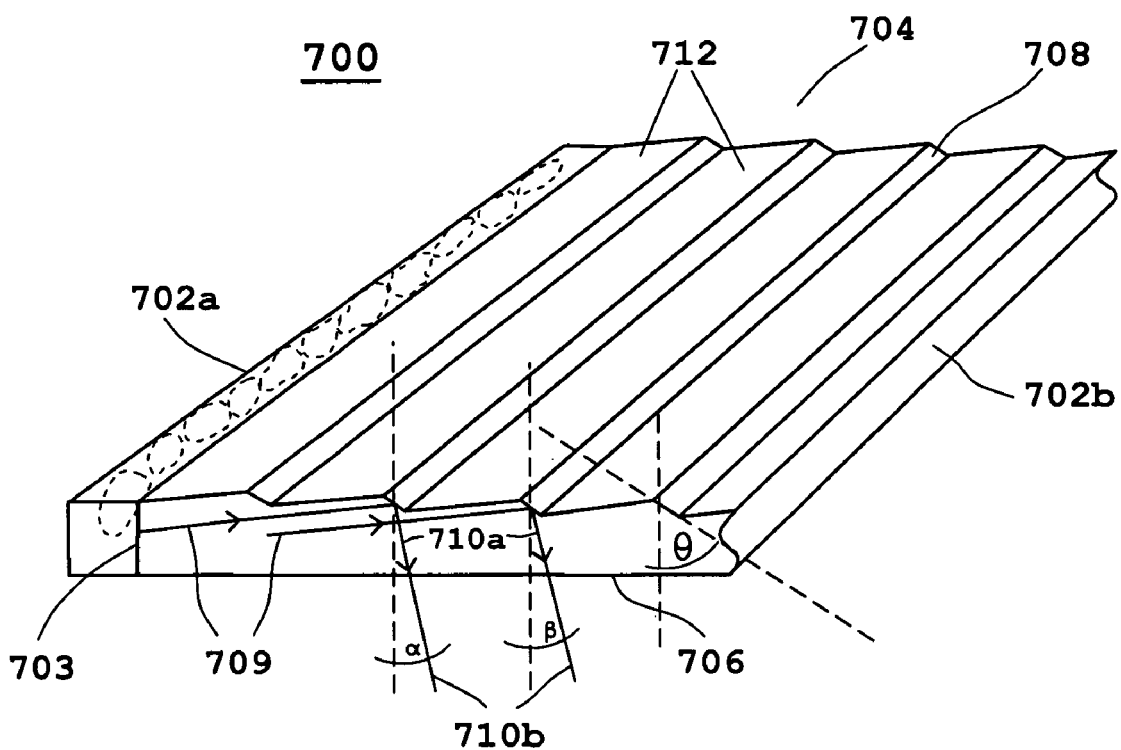
FIG. 9a is a perspective view of the light source assembly shown in FIG. 7 with a different tilt of strips of the light source assembly.
Figure 9B:
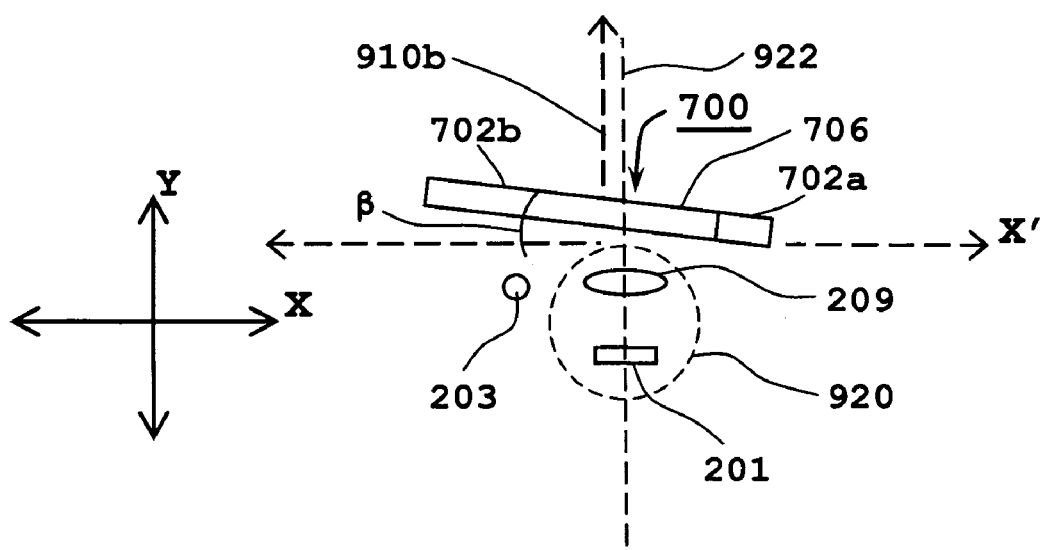

With reference to FIGS. 9a and 9b, light assembly 700 is shown, where the strips 708 are tilted from the vertical at an angle θ, where θ is greater than 45 degrees. Accordingly, the incoming light indicated by arrow 709 is directed towards the secondary surface 706 and bent so that the light is no longer directed perpendicular to the secondary surface 706, and is tilted from the vertical at an angle α, as indicated by arrow 910a, where α is shown in this example as approximately double (θ−45). Due to refraction at the secondary surface 706, the light is further bent as it exits the secondary surface 706, where the light exits the secondary surface 706 at an angle β, where β, is greater than α.

As shown in FIG. 9b, the light assembly 700 is tilted by the angle β, so that the light 910b exiting the light assembly 700 is parallel to the optical axis indicated by arrow 922 of the camera indicated by combination 920 of the optical code reading device 200. The tilting of the light assembly 700 may be performed, as shown, by rotating the light assembly 700 by the angle β about an axis that is perpendicular to the optical axis indicated by arrow 922, where the optical axis is shown parallel to the y-axis. FIG. 9b shows the light assembly 700 tilted at an angle β with respect to axis x', which is orthogonal to both of the x- and y-axes shown.

The angles θ and β may be selected in accordance with the desired effect and the refraction index of the material of the lightpipe 702b. The direct point light source may still be positioned to output light parallel to the optical axis 922 of the camera 920. By tilting the strips 708 and the light assembly 700 as described, the camera 920 may have an optical axis indicated by line 922 that is not perpendicular to the light assembly 700 and/or the window (not shown) of the system 200, including the condition in which the light assembly 700 functions as the window. The tilted configuration described provides the advantage of minimizing reflection into the camera 920 of light output by the direct light source 203 reflected from the light assembly 700 and/or window.

In FIG. 9b, direct light source 203 is placed in the x-y plane of the camera, where the light assembly 700 is tilted away from it. In alternative embodiment, the direct light source 203 is positioned on a plane that passes through the optical axis 922 and is perpendicular to the x-y plane. The light assembly 700 may be tilted similar to the embodiment shown FIG. 9b to minimize reflection into the camera 920 of light output by the direct light source 203.

Similarly, the light assemblies 800, 800' and 800" shown in FIGS. 8a–8f may be included in an imaging device having a camera, where the light assemblies 800, 800', 800"' are configured for causing the output light designated by arrow 820, 820' and 820" to be tilted by angle β relative to the exterior surface at end 805, 805', 805" of the lightpipe respectively. The entire light assemblies 800, 800', 800" may be tilted by rotating it by the angle β about an axis that is normal to the optical axis of the camera.

In FIG. 9b, the light assembly 700 is shown to have the direct point light source(s) 203 positioned at one side of the camera 920, as opposed to positioned symmetrically about the camera 920. The asymmetrical arrangement has advantages when imaging certain types of DPMs, particularly dot peened DPMs. Dot peened DPMs do not present native contrast. Rather, the surface profile modifications created in the marking process cause highlights and shadows during the imaging process. The data associated with the sensing of highlights and/or shadows created when using the asymmetrical arrangement may be easier to interpret, and thus provide improved results when scanning dot peened DPMs. When one single light source (such as an LED) is found to not provide a sufficient amount of light, several light sources may be used. In such a case, the several light sources should be placed in close proximity to each other, and significantly to one side of the camera, in order not to destroy the strong asymmetry that could be obtained from using a single light source. It is further envisioned, that a plurality of direct point light sources 203 may be positioned about the camera 920, in a symmetrical or asymmetrical configuration, where control logic circuitry is provided for enabling selected direct point light sources 203 of the plurality of direct point light sources 203 for providing symmetrical or asymmetrical illumination about the camera 920 in accordance with user or automatically generated requests.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A light assembly for generating an extended-beam light comprising:
    a lightpipe comprising an array of first portions and an array of second portions, wherein the first portions of the array of first portions alternate with second portions of the array of second portions; and
    a light source formation including an array of first light sources generating an array of corresponding first light beams directed at respective first portions, and an array of second light sources generating an array of corresponding second light beams directed at respective second portions, wherein the first light beams of the array of first light beams alternate with the second light beams of the array of second light beams;
    wherein at least one of respective first portions of the array of first portions and respective second portions of the array of second portions include at least one slanted surface, wherein the at least one slanted surface of the respective first portions is slanted with respect to the first light beams, and the at least one slanted surface of the respective second portions is slanted with respect to the second light beams for redirecting at least one of the first light beams and the second light beams for substantially eliminating gaps between adjacent first and second light beams for combining the array of first light beams and the array of second light beams into a continuous light beam which is output by the lightpipe as the extended-beam light.

2. The light assembly of claim 1, wherein the array of first portions and the array of second portions are formed of a single piece of material.

3. The light assembly of claim 1, wherein the respective first portions receive the array of first light beams from a first direction and output the received light in the first direction.

4. The light assembly of claim 1, wherein
    the array of first portions outputs light in a first direction;
    the respective second portions include the at least one slanted surface; and
    the array of second portions receives the array of second light beams from a second direction, redirects the received array of second light beams via the at least one slanted surface, and outputs the redirected array of second light beams in the first direction.

5. The light assembly of claim 4, wherein the at least one slanted surface of the respective second portions is two slanted surfaces for the respective second portions.

6. The light assembly of claim 5, wherein one slanted surface of the two slanted surfaces of a respective second portion is connected to the corresponding slanted surface of the two slanted surfaces of at least one other second portion, wherein the connected slanted surfaces are included in one continuous planar surface.

7. The light assembly of claim 4, wherein the at least one slanted surface of the respective second portions is one slanted surface for the respective second portions.

8. The light assembly of claim 1, wherein the array of first light sources and the array of second light sources are positioned in the same plane.

9. The light assembly of claim 1, wherein the array of first light sources and the array of second light sources output light in first and second directions, respectively.

10. The light assembly of claim 1, wherein the array of first light sources and the array of second light sources is included in one printed circuit board.

11. The light assembly of claim 1, wherein a width of respective light beams of at least one of the array of first light beams and the array of second light beams is greater than a width of the respective first or second portion which the respective light beams are directed at.

12. A light assembly for generating an extended-beam light comprising:
    a first lightpipe for emitting an extended-beam light, wherein the first lightpipe receives light through at least one entrance surface and emits the extended-beam light through an exit surface, wherein the at least one entrance surface collectively is substantially smaller in area than the exit surface; and
    a light source outputting light into the first lightpipe, the light source comprising:
        a second lightpipe comprising at least a first and second group of entrance surfaces and an exit surface through which light is output and provided to the at least one entrance surface of the first lightpipe, wherein at least a portion of the first group of entrance surfaces is non-collinear with respect at least a portion of the second group of entrance surfaces; and a light source formation including an array of first light sources generating an array of corresponding first light beams directed at respective entrance surfaces of the first group of entrance surfaces, and an array of second light sources generating an array of corresponding second light beams directed at respective entrance surfaces of the second group of entrance surfaces.

13. The light assembly of claim 12, wherein the at least one entrance surface of the first lightpipe is substantially linear.

14. The light assembly of claim 12, wherein respective entrance surfaces of the first group of entrance surfaces alternate with respective entrance surfaces of the second group of entrance surfaces.

15. The light assembly of claim 12, wherein respective first light beams of the array of first light beams alternate with respective second light beams of the array of second light beams.

16. The light assembly of claim 12, wherein at least one of respective entrance surfaces of the first group of entrance surfaces and respective entrance surfaces of the second group of entrance surfaces include at least one slanted surface, wherein the at least one slanted surface of the respective entrance surfaces of the first group of entrance surfaces is slanted with respect to the first light beams, and the at least one slanted surface of the respective entrance surfaces of the second group of entrance surfaces is slanted with respect to the second light beams for redirecting at least one of the first light beams and the second light beams for substantially eliminating gaps between adjacent first and second light beams for combining the array of first light beams and the array of second light beams into a continuous light beam which is the light output by the second lightpipe and provided to the first lightpipe.

17. The light assembly of claim 12, wherein the at least one entrance surface and the exit surface of the first lightpipe each have at least two dimensions defining the respective surface areas, and wherein a dimension of the at least two dimensions of the at least one entrance surface is substantially equal to a dimension of the at least two dimensions of the exit surface.

18. The light assembly of claim 12, wherein the first and second lightpipes are formed of a single piece of material.

19. A light source for a light assembly for outputting light into a first lightpipe for generating an extended-beam light, the light source comprising:

a second lightpipe comprising at least a first and second group of entrance surfaces and an exit surface through which light is output, wherein at least a portion of the first group of entrance surfaces is non-collinear with respect to at least a portion of the second group of entrance surfaces; and a light source formation including an array of first light sources generating an array of corresponding first light beams directed at respective entrance surfaces of the first group of entrance surfaces, and an array of second light sources generating an array of corresponding second light beams directed at respective entrance surfaces of the second group of entrance surfaces;

wherein the first lightpipe receives through at least one entrance surface the light output from the exit surface of the second lightpipe, and emits the extended-beam light through an exit surface, wherein the at least one entrance surface of the first lightpipe is collectively is substantially smaller in area than the exit surface of the first lightpipe.

20. The light source of claim 19, wherein the centers of the first group of entrance surfaces of the second lightpipe substantially lie along a first straight line, and the centers of the second group of entrance surfaces of the second lightpipe substantially lie along a second straight line, and the first and second straight lines are substantially parallel.

21. The light source of claim 19, wherein respective entrance surfaces of the first group of entrance surfaces alternate with respective entrance surfaces of the second group of entrance surfaces.

22. The light source of claim 19, wherein respective first light beams of the array of first light beams alternate with respective second light beams of the array of second light beams.

23. The light source of claim 19, wherein at least one of respective entrance surfaces of the first group of entrance surfaces and respective entrance surfaces of the second group of entrance surfaces include at least one slanted surface, wherein the at least one slanted surface of the respective entrance surfaces of the first group of entrance surfaces is slanted with respect to the first light beams, and the at least one slanted surface of the respective entrance surfaces of the second group of entrance surfaces is slanted with respect to the second light beams for redirecting at least one of the first light beams and the second light beams for substantially eliminating gaps between adjacent first and second light beams for combining the array of first light beams and the array of second light beams into a continuous light beam which is the light output by the second lightpipe and provided to the first lightpipe.

24. The light source of claim 19, wherein the at least one entrance surface and the exit surface of the first lightpipe each have at least two dimensions defining the respective surface areas, and wherein a dimension of the at least two dimensions of the at least one entrance surface is substantially equal to a dimension of the at least two dimensions of the exit surface.

25. A frontlight assembly comprising:

a light source including a plurality of LEDs, wherein at least a portion of the plurality of LEDs are packaged together in an LED light bar; and a lightpipe receiving light emitted by the light bar and emitting an extended-beam light, wherein the lightpipe includes a plurality of total internal reflection (TIR) surfaces for redirecting received light into a different direction.

26. A frontlight assembly comprising:

a light source including a plurality of LEDs, wherein at least a portion of the plurality of LEDs are packaged together in an LED light bar; and a lightpipe receiving light emitted by the light bar and emitting an extended-beam light, wherein the lightpipe receives light through at least one entrance surface and emits the extended-beam light through an exit surface, wherein the exit and at least one of the entrance surfaces are not parallel.

27. A frontlight assembly comprising:

a light source including a plurality of LEDs, wherein at least a portion of the plurality of LEDs are packaged together in an LED light bar; and a lightpipe receiving light emitted by the light bar and emitting an extended-beam light, wherein the lightpipe receives light through at least one entrance surface and emits the extended-beam light through an exit surface, wherein the entrance surface is substantially smaller in area than the exit surface.

28. A method for generating an extended light beam comprising the steps of:
outputting an array of first light beams;
directing the array of first light beams into a lightpipe;
outputting an array of second light beams, wherein light beams of the array of second light beams alternate with light beams of the array of first light beams;
directing the array of second light beams into the lightpipe;
redirecting at least one of the array of first light beams and the array of second light beams within the lightpipe for eliminating gaps between adjacent first and second light beams for combining the array of first light beams and the array of second light beams into a continuous light beam; and
outputting the continuous light beam from the lightpipe as the extended-beam light.

29. An imaging device comprising:
a light assembly outputting an extended-beam light for illuminating a target to be imaged, the light assembly comprising:
a light source formation having at least one light source outputting at least one light beam;
a lightpipe receiving the at least one light beam comprising:
at least one slanted surface for redirecting at least a portion of the at least one light beam; and
an exterior face through which light from the redirected light exits, wherein the exiting light exits the exterior face at a predetermined angle offset from a vector exiting the exterior face normal thereto;
a camera having:
a sensor array for sensing light reflected by the target and generating signals related to at least one image of the target; and
an optical assembly having at least one lens for focusing the reflected light on the sensor array, the optical assembly having an optical axis;
wherein the light assembly is tilted by rotating the light assembly by the predetermined angle about an axis that is normal to the optical axis.

30. The imaging device of claim 29, wherein the imaging device is an optical code reader.

31. The imaging device of claim 29, further comprising at least one direct point light source for illuminating the target, wherein one of the direct point light source and the light assembly are selected for illuminating the target.

32. The imaging device of claim 29, wherein the light assembly is a frontlight assembly positioned in front of the camera.

33. The imaging device of claim 29, further comprising at least one direct point light source for illuminating the target, wherein one of the direct point light source and the light assembly are selected for illuminating the target;
wherein the light assembly is a frontlight assembly positioned in front of the camera and the direct point light source; and
wherein the tilt of the light assembly minimizes reflection of light generated by the direct point light source from the light assembly onto the camera.

34. The imaging device of claim 29, wherein the light assembly further functions as a window of the imaging device.

* * * * *